(12) United States Patent
Jedlicka et al.

(10) Patent No.: US 8,429,627 B2
(45) Date of Patent: Apr. 23, 2013

(54) ASYNCHRONOUS PREEMPTIVE EDIT TIME SEMANTIC ANALYSIS OF A GRAPHICAL PROGRAM

(75) Inventors: David C. Jedlicka, Austin, TX (US); Jeffrey L. Kodosky, Austin, TX (US); Gregory C. Richardson, Round Rock, TX (US); John D. Stanhope, Pflugerville, TX (US)

(73) Assignee: National Instruments Corporation, Austin, TX (US)

( * ) Notice: Subject to any disclaimer, the term of this patent is extended or adjusted under 35 U.S.C. 154(b) by 750 days.

(21) Appl. No.: 12/577,284

(22) Filed: Oct. 12, 2009

(65) Prior Publication Data

US 2011/0088019 A1     Apr. 14, 2011

(51) Int. Cl.
G06F 9/45  (2006.01)

(52) U.S. Cl.
USPC ........... 717/143; 717/140; 717/141; 717/142; 717/144

(58) Field of Classification Search ........................ None
See application file for complete search history.

(56) References Cited

U.S. PATENT DOCUMENTS

| | | | | |
|---|---|---|---|---|
| 4,947,315 | A * | 8/1990 | Sokolow et al. | 717/111 |
| 5,905,649 | A | 5/1999 | Sojoodi et al. | |
| 5,999,729 | A * | 12/1999 | Tabloski et al. | 717/105 |
| 6,064,816 | A | 5/2000 | Parthasarathy et al. | |
| 6,249,907 | B1 * | 6/2001 | Carter et al. | 717/129 |
| 7,028,222 | B2 * | 4/2006 | Peterson et al. | 714/38.1 |
| 7,086,040 | B2 * | 8/2006 | Joisha et al. | 717/137 |
| 7,331,037 | B2 * | 2/2008 | Dickey et al. | 717/106 |
| 7,370,318 | B1 * | 5/2008 | Howe et al. | 717/110 |
| 7,765,531 | B2 * | 7/2010 | Gilbert et al. | 717/141 |
| 8,196,122 | B2 * | 6/2012 | McCrady et al. | 717/144 |
| 2003/0214519 | A1 * | 11/2003 | Smith et al. | 345/660 |
| 2003/0237026 | A1 * | 12/2003 | Petersen et al. | 714/38 |
| 2004/0015906 | A1 * | 1/2004 | Goraya | 717/141 |

(Continued)

OTHER PUBLICATIONS

U.S. Appl. No. 09/742,946 entitled, "System and Method for Performing Type Checking for Hardware Device Nodes in a Graphical Program", by Steven W. Rogers and Jason S. King, filed Dec. 20, 2000.

(Continued)

*Primary Examiner* — Henry Tsai
*Assistant Examiner* — Jing-Yih Shyu
(74) *Attorney, Agent, or Firm* — Meyertons Hood Kivlin Kowert & Goetzel, P.C.; Jeffrey C. Hood; Mark S. Williams

(57) ABSTRACT

System and method for analyzing a graphical program. A graphical program is displayed on a display. A semantic edit operation is performed on the graphical program in response to user input. The semantic edit operation is performed by a first process. Semantic analysis of the graphical program is performed by a second process in response to performing the semantic edit operation, where the second process is asynchronous with respect to the first process. Results from the semantic analysis of the graphical program are displayed in response to completion of the semantic analysis. If during the semantic analysis, another semantic edit operation is performed on the graphical program, the semantic analysis may be preemptively terminated and re-initiated. Displaying results from the semantic analysis of the graphical program may then include displaying results from the re-initiated semantic analysis of the graphical program in response to completion of the re-initiated semantic analysis.

19 Claims, 13 Drawing Sheets

U.S. PATENT DOCUMENTS

| | | | |
|---|---|---|---|
| 2005/0071312 A1* | 3/2005 | Chau et al. | 707/1 |
| 2007/0033580 A1* | 2/2007 | Ringseth et al. | 717/137 |
| 2007/0130571 A1* | 6/2007 | Ringseth et al. | 719/313 |
| 2009/0070553 A1* | 3/2009 | Wallach et al. | 712/34 |

OTHER PUBLICATIONS

U.S. Appl. No. 11/269,217 entitled, "Type Propagation for Automatic Casting of Output Types in a Data Flow Program", by Stephen R. Mercer and Steven W. Rogers, filed Nov. 8, 2005.

U.S. Appl. No. 11/838,387 entitled, "Type Generic Graphical Programming", by Satish V. Kumar, Duncan G. Hudson III, Jeffrey L. Kodosky, Steven W. Rogers, and Newton G. Petersen, filed Aug. 14, 2007.

U.S. Appl. No. 12/430,157 entitled, "Conversion of a Class Oriented Data Flow Program to a Structure Oriented Data Flow Program", by Stephen R. Mercer, Akash B. Bhakta, and Matthew E. Novacek, filed Apr. 27, 2009.

* cited by examiner

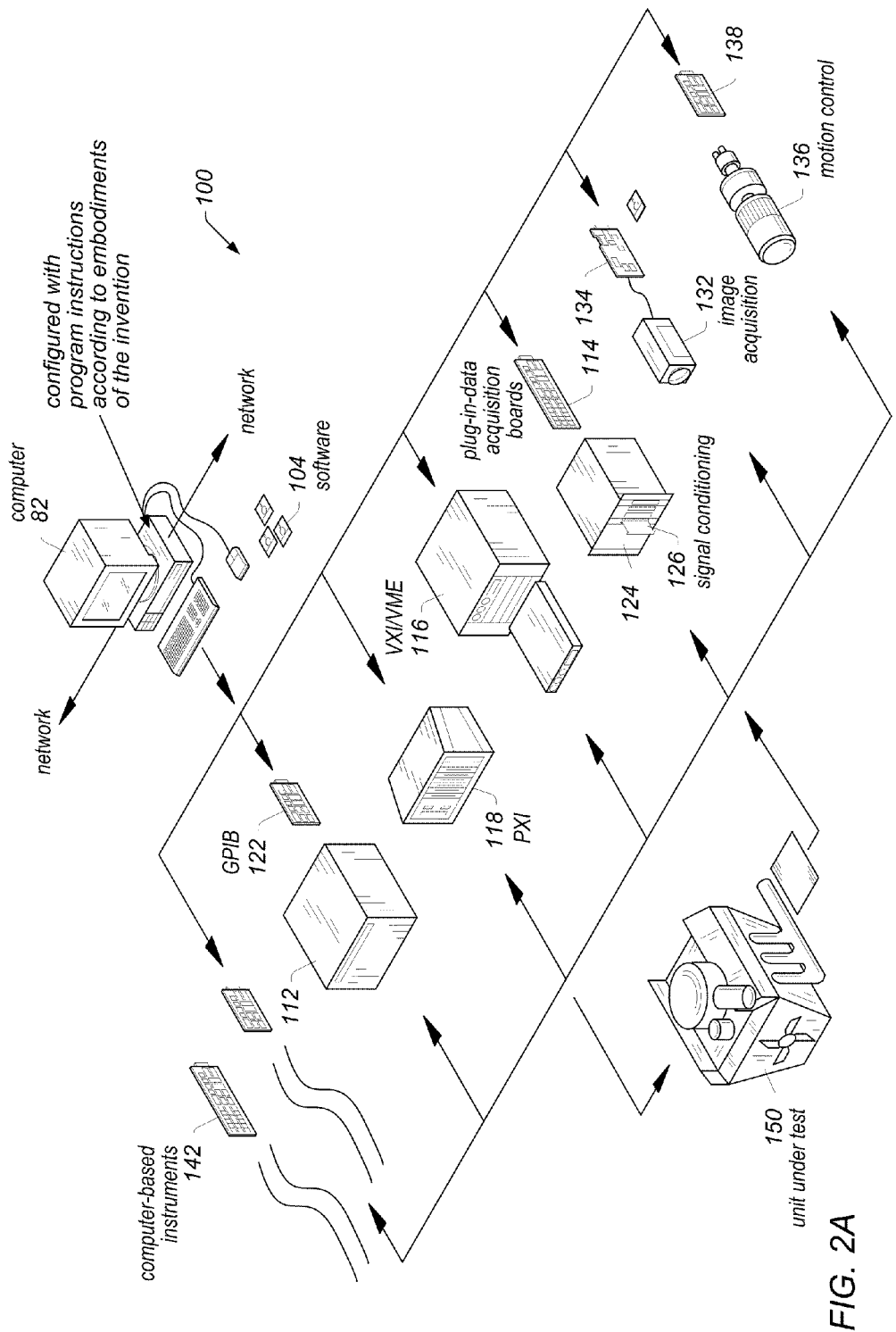

ASYNCHRONOUS PREEMPTIVE EDIT TIME SEMANTIC ANALYSIS OF A GRAPHICAL PROGRAM

FIELD OF THE INVENTION

The present invention relates to the field of graphical programming, and more particularly to a system and method for performing edit time semantic analysis of a graphical program in an asynchronous manner.

DESCRIPTION OF THE RELATED ART

Graphical programming has become a powerful tool available to programmers. Graphical programming environments such as the National Instruments LabVIEW product have become very popular. Tools such as LabVIEW have greatly increased the productivity of programmers, and increasing numbers of programmers are using graphical programming environments to develop their software applications. In particular, graphical programming tools are being used for test and measurement, data acquisition, process control, man machine interface (MMI), supervisory control and data acquisition (SCADA) applications, modeling, simulation, image processing/machine vision applications, and motion control, among others.

In typical prior art program development systems, once the programmer has written a program, a compiler analyzes the program to determine any errors. Compilers typically have three phases of analysis: lexical (related to the programming language's terms or vocabulary), syntactical (related to determining errors of form, e.g., of expression in the programming language, such as missing parentheses, brackets, or semicolons, etc.), and semantic (related to determining logical errors). Some graphical programs, e.g., developed in a dataflow based graphical programming language such as LabVIEW™, provided by National Instruments Corporation, do not require lexical or syntactical analysis, as the programming model/language has lexical and syntactical information built in. In semantic analysis semantic information is constructed and checked. In some systems, such as LabVIEW, semantic analysis is performed at edit time, rather than at compile time.

In typical prior art approaches to such edit time semantic analysis, semantic analysis is performed after each semantic edit by the user, and the user must wait while the program is checked, and errors and data types reported or updated graphically. In other words, prior art type checking of errors and type information updating have generally been performed "immediately" after the user input, with the user forced to wait until this process is complete before any other actions can be taken. In the case of large programs, major edits, and more advanced editing environments, this analysis can take a discernable, and even lengthy, period of time to complete, during which the user must simply wait. Often, the user makes several related quick edits, yet the editor requires the user to wait for full semantic analysis and reporting between each of these changes, even though when making a quick series of related edits, intermediate analysis results, e.g., type checking results and errors, are unimportant and typically incorrect.

Thus, improved systems and methods for semantic analysis of graphical programs are desired.

SUMMARY OF THE INVENTION

Various embodiments of a system and method for performing asynchronous edit time semantic analysis of a graphical program are presented below.

A graphical program may be displayed on a display, e.g., of a computer. In some embodiments, the graphical program may be or include a graphical data flow program. The graphical program may implement any functionality desired, including, for example, an industrial automation function, a process control function, or a test and measurement function, among others, as mentioned above. The graphical program may comprise a plurality of interconnected nodes or icons which visually indicate the functionality of the graphical program, and may include a block diagram (that includes the interconnected nodes) and may also include a user interface portion or front panel portion.

A semantic edit operation may be performed on the graphical program in response to user input, where the semantic edit operation may be performed by or via a first process. For example, in one embodiment, an editor, which may be included in or part of a graphical program development environment, may execute in or via the first process, and may receive user input specifying the semantic edit operation, in response to which the semantic edit operation may be performed, e.g., by the editor (executing in or via the first process).

A semantic edit operation modifies the semantics of the program, i.e., modifies the functionality of the program, e.g., by changing functional elements of the program e.g., as opposed to cosmetic modifications. Examples of semantic edit operations include (but are not limited to) adding a graphical program node to the graphical program, removing a graphical program node from the graphical program, adding a connection to the graphical program, removing a connection from the graphical program, or changing a connection in the graphical program, e.g., changing the interconnections among the nodes. Some nodes can actually change their configuration (e.g., size, number of inputs, number of outputs, etc.) as a result of semantic analysis; more specifically, semantic analysis may determine that a type has changed on certain nodes and this may have an additional effect in changing something about the node's configuration or operational mode.

Semantic analysis of the graphical program may be performed in response to the semantic edit operation. For example, in one embodiment, the semantic analysis may include one or more of: type propagation, type checking, argument checking, or object binding, among others. In some embodiments, the semantic analysis may be performed by or in a second process that is asynchronous with respect to the first process. For example, in various embodiments, the first process and the second process may be implemented via respective execution threads, and/or via respective processors or processing cores. In one embodiment, the semantic edit operation may be performed by an editor executing in the first process, and the semantic analysis may be performed as a background process in or by the second process. In a similar embodiment, the semantic edit operation may be performed by the editor executing in the first process, and the semantic analyses may be performed in the second process in parallel (i.e., concurrently) with the editor executing in the first process. Thus, the user may continue to edit the graphical program via the first process while the semantic analysis is being performed via the second process.

Thus, for example, in an exemplary embodiment based on asynchronous use of user-interface threads and background threads, semantic checking may be performed in a background thread while the user may continue to edit in a user-interface thread. Should the user perform any semantic edit (e.g., that would invalidate the results of the semantic analysis currently being performed), the method may abort the current background (semantic analysis) thread and start a new one based on the program's new state. Should the entire semantic analysis complete before the user has made any changes to the program, the method may callback into the user-interface thread with the semantic analyzed and updated copy of the program. The user-interface thread may then make the user wait while the original program's types and errors are updated (quickly) and displayed, e.g., graphically.

It should be noted that while in some embodiments, the first and second processes may execute on respective processors or processing cores, e.g., via one or more respective execution threads executing on the respective processor or core, in other embodiments, the first and second processes may execute on a single processor or processing core, e.g., via respective threads sharing the single processor or core. Thus, the parallelism or concurrency may be implemented strictly, or via resource sharing, e.g., interleaved thread execution, between which techniques the differences may not be apparent to the user.

In further embodiments, the second process, and/or the first process, may itself comprise multiple asynchronous or parallel processes, e.g., parallel sub-processes. In other words, one or both of the first and second processes may comprise two or more respective asynchronous or parallel processes. Thus, for example, in one embodiment, the semantic analysis may be performed by multiple threads executing in parallel, e.g., executing on respective processors or processing cores, e.g., at least partly concurrently.

In some embodiments, performing semantic analysis of the graphical program may include performing semantic analysis on a specified portion (or portions) of the graphical program in which the semantic edit operation was performed. In other words, the semantic analysis may not be performed on the entire graphical program, but may be limited to those portions affected by the semantic edit operation.

In response to completion of the semantic analysis, results of the semantic analysis of the graphical program may be displayed on the display, e.g., a computer display coupled to the computer hosting the development environment/editor.

In various embodiments, the results of the semantic analysis may include any information that may be useful in developing or debugging the graphical program. For example, in some embodiments, the results of the semantic analysis may include one or more of: one or more errors, one or more warnings, one or more data type assignments to node inputs and outputs, one or more configuration changes to nodes, or one or more semantic notations indicating areas of concern in the program, among others. Moreover, the results may be displayed or presented in any of a variety of ways. For example, in one embodiment, at least one of the one or more errors, the one or more warnings, the one or more data type assignments, the one or more configuration changes, or the one or more semantic notations may be represented graphically in the graphical program.

In some embodiments, during the semantic analysis, another semantic edit operation may be performed on the graphical program in response to next user input. As with the first semantic edit operation, the other semantic edit operation may be performed by the first process. Note that the above descriptions regarding semantic edit operations in general may also be applied to this other semantic edit operation (and subsequent operations, as well).

In response to the performing of the other semantic edit operation, the semantic analysis may be preemptively terminated, e.g., aborted, and re-initiated, where, as before, the re-initiated semantic analysis may be performed by the second process asynchronously with respect to the first process.

Thus, for example, in an embodiment where the first process (in which the editor executes) includes or utilizes one or more execution threads and/or processors or cores, and the second process (in which the semantic analysis is performed) includes or utilizes a respective other one or more execution threads and/or processors or cores, the editor performing the second semantic edit operation may cause or invoke termination and re-initiation of the semantic analysis, whereby the graphical program, as just edited, may be semantically analyzed. Said another way, the other (i.e., subsequent) semantic edit operation may result in preemptive restarting of the semantic analysis (preemptive with respect to the semantic analysis that is/was currently being performed).

It should be noted that in embodiments utilizing threads, the second process may or may not use the exact same thread or threads for each performance of the semantic analysis. For example, if threads are assigned to the respective processes in an ad hoc manner, then the thread(s) used in the restarted analysis may be different from the thread(s) used in the initial analysis, the crucial point being that the analysis is performed asynchronously with respect to the process in which the edit operations (e.g., the editor) are executed.

The above performing another semantic edit operation and preemptively terminating and re-initiating performing the semantic analysis may be performed one or more times, i.e., may be repeated zero or more times, as desired. For example, in one embodiment, each time a semantic edit operation is performed, if the semantic analysis is not yet finished, the semantic analysis may be preemptively stopped and restarted, executing asynchronously (e.g., in the background) with respect to the editor.

In some embodiments the semantic analysis may only be performed with respect to the specified portion (or portions) of the graphical program in which the semantic edit operation was performed. However, in some cases, the other semantic edit operation (or a subsequent semantic edit operation) may affect semantic relations elsewhere in the graphical program besides the immediate portion in which the edit occurs. In other words, the other (subsequent) semantic edit operation may invalidate results of previous semantic analysis (or analyses) performed on another respective portion (or portions) of the graphical program.

In a related embodiment, the semantic analysis may be preemptively terminated and restarted if the other semantic edit operation(s) would invalidate not only results from the current semantic analysis, but of one or more previous semantic analyses, as well. Thus, in some embodiments, re-initiating performing the semantic analysis with respect to the graphical program in the second process may include re-initiating performing semantic analysis on at least a specified portion of the graphical program in which the other semantic edit operation was performed. Thus, for example, in one embodiment, the semantic analysis may be re-initiated with respect to not only the portion of the graphical program in which the other (e.g., most recent) semantic edit operation was performed, but also with respect to one or more additional portions of the graphical program, e.g., those that have been previously analyzed.

It should be noted that in some embodiments, not all semantic edit operations may trigger the preemptive termination and re-initialization of the semantic analysis. For example, semantic edits that would not invalidate results from the current semantic analysis may not do so. Thus, in one embodiment, the other semantic edit operations may be limited to semantic edit operations that would invalidate results from semantic analysis currently being performed.

Thus, in one embodiment, the method may include performing one or more further edit operations on the graphical program in response to further user input, where the one or more further edit operations are performed by the first process, and where the one or more further edit operations would not invalidate results from semantic analysis currently being performed, and where the one or more further edit operations do not cause preemptive termination and re-initiation of performing the semantic analysis with respect to the graphical program in the second process.

In some embodiments, performing the semantic analysis of the graphical program may include making a copy of the graphical program, and performing semantic analysis on the copy of the graphical program. This may both facilitate and take advantage of the asynchronous relationship between the functionality or operation of the editor (or development environment) and the semantic analysis process in that the semantic analysis may proceed while the user continues to edit the graphical program. In other words, during the semantic analysis, the user may continue editing without fear of corruption from concurrent edits.

In further embodiments, it may be more efficient or effective to perform semantic analysis on another form of the graphical program, and so performing semantic analysis of the graphical program may include making an alternate representation of the graphical program, and performing semantic analysis on the alternate representation of the graphical program. In other words, the semantic analysis may be at least somewhat optimized by converting or translating the graphical program to another form more amenable to the semantic analysis. For example, in one exemplary embodiment, the alternate representation may be or include a data flow intermediate representation (DFIR), in which data flow protocols are maintained but various of the program elements and/or structures may be simplified or otherwise replaced or reorganized. This copy or alternate representation of the program may be or follow a data flow model, but may be optimized for semantic analysis and optimizations. Semantic analysis can then be safely performed on this alternative model copy asynchronously, in a parallel process. Note, however, that in other embodiments, any other alternate representations may be used as desired.

Thus, various embodiments of the techniques disclosed herein may facilitate improved analysis of graphical programs.

BRIEF DESCRIPTION OF THE DRAWINGS

A better understanding of the present invention can be obtained when the following detailed description of the preferred embodiment is considered in conjunction with the following drawings, in which:

FIG. 2A illustrates an instrumentation control system according to one embodiment of the invention;

Figure 1A:
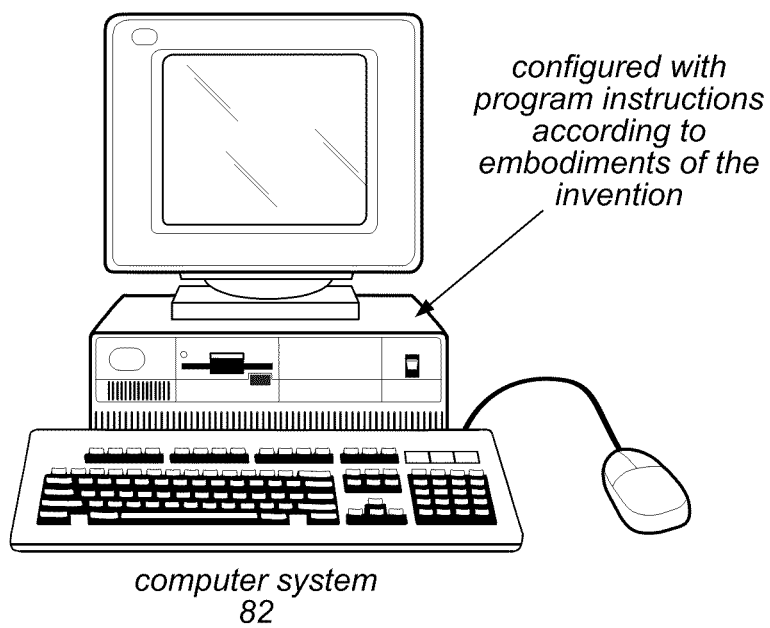
FIG. 1A illustrates a computer system configured to execute a graphical program according to an embodiment of the present invention.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Incorporation by Reference:

The following references are hereby incorporated by reference in their entirety as though fully and completely set forth herein:

U.S. application Ser. No. 09/742,946 titled "System and Method for Performing Type Checking for Hardware Device Nodes in a Graphical Program," filed on Dec. 20, 2000.

U.S. application Ser. No. 11/269,217 titled "Type Propagation For Automatic Casting Of Output Types In A Data Flow Program," filed on Nov. 8, 2005.

U.S. application Ser. No. 12/430,157 titled "Conversion of a Class Oriented Data Flow Program to a Structure Oriented Data Flow Program," filed on Apr. 27, 2009.

U.S. application Ser. No. 11/838,387 titled "Type Generic Graphical Programming," filed on Apr. 27, 2009.

U.S. Pat. No. 5,905,649 titled "System And Method For Performing Type Checking And Class Propagation Of Attributes In A Graphical Data Flow Program," issued on May 18, 1999.

U.S. Pat. No. 6,064,816 titled "System and Method for Performing Class Propagation and Type Checking in a Graphical Automation Client," issued on May 16, 2000.

U.S. Pat. No. 7,331,037 titled "Static Memory Allocation In A Graphical Programming System," issued on Feb. 12, 2008.

U.S. Pat. No. 4,914,568 titled "Graphical System for Modeling a Process and Associated Method," issued on Apr. 3, 1990.

U.S. Pat. No. 5,481,741 titled "Method and Apparatus for Providing Attribute Nodes in a Graphical Data Flow Environment".

U.S. Pat. No. 6,173,438 titled "Embedded Graphical Programming System" filed Aug. 18, 1997.

U.S. Pat. No. 6,219,628 titled "System and Method for Configuring an Instrument to Perform Measurement Functions Utilizing Conversion of Graphical Programs into Hardware Implementations," filed Aug. 18, 1997.

U.S. Patent Application Publication No. 20010020291 (Ser. No. 09/745,023) titled "System and Method for Programmatically Generating a Graphical Program in Response to Program Information," filed Dec. 20, 2000.

Terms

The following is a glossary of terms used in the present application:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, and/or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Program—the term "program" is intended to have the full breadth of its ordinary meaning The term "program" includes 1) a software program which may be stored in a memory and is executable by a processor or 2) a hardware configuration program useable for configuring a programmable hardware element.

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, PASCAL, FORTRAN, COBOL, JAVA, assembly language, etc.; graphical programs (programs written in graphical programming languages); assembly language programs; programs that have been compiled to machine language; scripts; and other types of executable software. A software program may comprise two or more software programs that interoperate in some manner. Note that various embodiments described herein may be implemented by a computer or software program. A software program may be stored as program instructions on a memory medium.

Hardware Configuration Program—a program, e.g., a netlist or bit file, that can be used to program or configure a programmable hardware element.

Graphical Program—A program comprising a plurality of interconnected nodes or icons, wherein the plurality of interconnected nodes or icons visually indicate functionality of the program. The interconnected nodes or icons are graphical source code for the program. Graphical function nodes may also be referred to as blocks.

The following provides examples of various aspects of graphical programs. The following examples and discussion are not intended to limit the above definition of graphical program, but rather provide examples of what the term "graphical program" encompasses:

The nodes in a graphical program may be connected in one or more of a data flow, control flow, and/or execution flow format. The nodes may also be connected in a "signal flow" format, which is a subset of data flow.

Exemplary graphical program development environments which may be used to create graphical programs include LabVIEW®, DasyLab™, DiaDem™ and Matrixx/SystemBuild™ from National Instruments, Simulink® from the MathWorks, VEE™ from Agilent, WiT™ from Coreco, Vision Program Manager™ from PPT Vision, SoftWIRE™ from Measurement Computing, Sanscript™ from Northwoods Software, Khoros™ from Khoral Research, SnapMaster™ from HEM Data, VisSim™ from Visual Solutions, ObjectBench™ by SES (Scientific and Engineering Software), and VisiDAQ™ from Advantech, among others.

The term "graphical program" includes models or block diagrams created in graphical modeling environments, wherein the model or block diagram comprises interconnected blocks (i.e., nodes) or icons that visually indicate operation of the model or block diagram; exemplary graphical modeling environments include Simulink®, SystemBuild™, VisSim™, Hypersignal Block Diagram™, etc.

A graphical program may be represented in the memory of the computer system as data structures and/or program instructions. The graphical program, e.g., these data structures and/or program instructions, may be compiled or interpreted to produce machine language that accomplishes the desired method or process as shown in the graphical program.

Input data to a graphical program may be received from any of various sources, such as from a device, unit under test, a process being measured or controlled, another computer program, a database, or from a file. Also, a user may input data to a graphical program or virtual instrument using a graphical user interface, e.g., a front panel.

A graphical program may optionally have a GUI associated with the graphical program. In this case, the plurality of interconnected blocks or nodes are often referred to as the block diagram portion of the graphical program.

Node—In the context of a graphical program, an element that may be included in a graphical program. The graphical program nodes (or simply nodes) in a graphical program may also be referred to as blocks. A node may have an associated icon that represents the node in the graphical program, as well as underlying code and/or data that implements functionality of the node. Exemplary nodes (or blocks) include function nodes, sub-program nodes, terminal nodes, structure nodes, etc. Nodes may be connected together in a graphical program by connection icons or wires.

Data Flow Program—A Software Program in which the program architecture is that of a directed graph specifying the flow of data through the program, and thus functions execute whenever the necessary input data are available. Data flow programs can be contrasted with procedural programs, which specify an execution flow of computations to be performed.

Graphical Data Flow Program (or Graphical Data Flow Diagram)—A Graphical Program which is also a Data Flow Program. A Graphical Data Flow Program comprises a plurality of interconnected nodes (blocks), wherein at least a subset of the connections among the nodes visually indicate that data produced by one node is used by another node. A LabVIEW VI is one example of a graphical data flow program. A Simulink block diagram is another example of a graphical data flow program.

Graphical User Interface—this term is intended to have the full breadth of its ordinary meaning The term "Graphical User Interface" is often abbreviated to "GUI". A GUI may comprise only one or more input GUI elements, only one or more output GUI elements, or both input and output GUI elements.

The following provides examples of various aspects of GUIs. The following examples and discussion are not intended to limit the ordinary meaning of GUI, but rather provide examples of what the term "graphical user interface" encompasses:

A GUI may comprise a single window having one or more GUI Elements, or may comprise a plurality of individual GUI Elements (or individual windows each having one or more GUI Elements), wherein the individual GUI Elements or windows may optionally be tiled together.

A GUI may be associated with a graphical program. In this instance, various mechanisms may be used to connect GUI Elements in the GUI with nodes in the graphical program. For example, when Input Controls and Output Indicators are created in the GUI, corresponding nodes (e.g., terminals) may be automatically created in the graphical program or block diagram. Alternatively, the user can place terminal nodes in the block diagram which may cause the display of corresponding GUI Elements front panel objects in the GUI, either at edit time or later at run time. As another example, the GUI may comprise GUI Elements embedded in the block diagram portion of the graphical program.

Front Panel—A Graphical User Interface that includes input controls and output indicators, and which enables a user to interactively control or manipulate the input being provided to a program, and view output of the program, while the program is executing.

A front panel is a type of GUI. A front panel may be associated with a graphical program as described above.

In an instrumentation application, the front panel can be analogized to the front panel of an instrument. In an industrial automation application the front panel can be analogized to the MMI (Man Machine Interface) of a device. The user may adjust the controls on the front panel to affect the input and view the output on the respective indicators.

Graphical User Interface Element—an element of a graphical user interface, such as for providing input or displaying output. Exemplary graphical user interface elements comprise input controls and output indicators.

Input Control—a graphical user interface element for providing user input to a program. An input control displays the value input by the user and is capable of being manipulated at the discretion of the user. Exemplary input controls comprise dials, knobs, sliders, input text boxes, etc.

Output Indicator—a graphical user interface element for displaying output from a program. Exemplary output indicators include charts, graphs, gauges, output text boxes, numeric displays, etc. An output indicator is sometimes referred to as an "output control".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Measurement Device—includes instruments, data acquisition devices, smart sensors, and any of various types of devices that are configured to acquire and/or store data. A measurement device may also optionally be further configured to analyze or process the acquired or stored data. Examples of a measurement device include an instrument, such as a traditional stand-alone "box" instrument, a computer-based instrument (instrument on a card) or external instrument, a data acquisition card, a device external to a computer that operates similarly to a data acquisition card, a smart sensor, one or more DAQ or measurement cards or modules in a chassis, an image acquisition device, such as an image acquisition (or machine vision) card (also called a video capture board) or smart camera, a motion control device, a robot having machine vision, and other similar types of devices. Exemplary "stand-alone" instruments include oscilloscopes, multimeters, signal analyzers, arbitrary waveform generators, spectroscopes, and similar measurement, test, or automation instruments.

A measurement device may be further configured to perform control functions, e.g., in response to analysis of the acquired or stored data. For example, the measurement device may send a control signal to an external system, such as a motion control system or to a sensor, in response to particular data. A measurement device may also be configured to perform automation functions, i.e., may receive and analyze data, and issue automation control signals in response.

Subset—in a set having N elements, the term "subset" comprises any combination of one or more of the elements, up to and including the full set of N elements. For example, a subset of a plurality of icons may be any one icon of the plurality of the icons, any combination of one or more of the icons, or all of the icons in the plurality of icons. Thus, a subset of an entity may refer to any single element of the entity as well as any portion up to and including the entirety of the entity.

Model of Computation (or Computational Model)—a model for visually specifying or visually representing program code to a user. A "model of computation" may also be considered as a set of program semantics of a programming language. Examples of "models of computation" include various forms of graphical data flow, such as data driven data flow (e.g., LabVIEW), demand driven data flow, and statically-scheduled data flow (including, but not limited to, synchronous data flow, heterochronous data flow, cyclo-static data flow, parameterized synchronous data flow, and discrete time data flow); synchronous reactive; process network; state diagram; control flow diagram; simulation diagram models (continuous time simulation data flow); various forms of text-based code (such as Matlab and MathScript, C, C++, etc.); and/or physical simulation (including physical domains such as circuits, hydrodynamics, mechanics, device modeling, thermodynamics, etc.), among others. "Statically-scheduled data flow" is data flow in which the firing pattern (i.e. execution order) of nodes is data-independent and can, therefore, be determined before run-time, e.g. at compile time. A "process network" is a set of deterministic sequential processes communicating through FIFO channels. "Synchronous reactive" can refer to a program where operations are given a certain amount of time to react, and if this constraint holds, the rest of the system appears synchronous.

A program portion may be visually represented on a display in a first computational model, but may in fact be actually implemented in the computer using a different computational model that may be hidden from the user. For example, Matlab is a text-based scripting language that is implanted in the C programming language. As another example, MathScript is a text-based scripting language implemented in the LabVIEW graphical programming language. A program portion may be represented in a first model of computation to provide a more intuitive visual representation of the functionality of the program portion, e.g., to allow the user to more readily understand and/or edit the program portion.

FIG. 1A—Computer System

FIG. 1A illustrates an exemplary computer system 82 configured to implement an embodiment of the invention. Embodiments of a method for analyzing a graphical program are described below.

As shown in FIG. 1A, the computer system 82 may include a display device configured to display the graphical program as the graphical program is created, edited, analyzed and debugged, and/or executed. The display device may also be configured to display a graphical user interface or front panel of the graphical program during execution of the graphical program. The graphical user interface may comprise any type of graphical user interface, e.g., depending on the computing platform.

The computer system 82 may include at least one memory medium on which one or more computer programs or software components according to one embodiment of the present invention may be stored. For example, the memory medium may store a graphical programming development environment application used to create and/or execute graphical programs. Additionally, the memory medium may store one or more programs, e.g., graphical programs, which are executable to perform the methods described herein, e.g., under or as part of the graphical programming development environment application. The memory medium may also store operating system software, as well as other software for operation of the computer system. Various embodiments further include receiving or storing instructions and/or data implemented in accordance with the foregoing description upon a carrier medium.

Figure 1B:
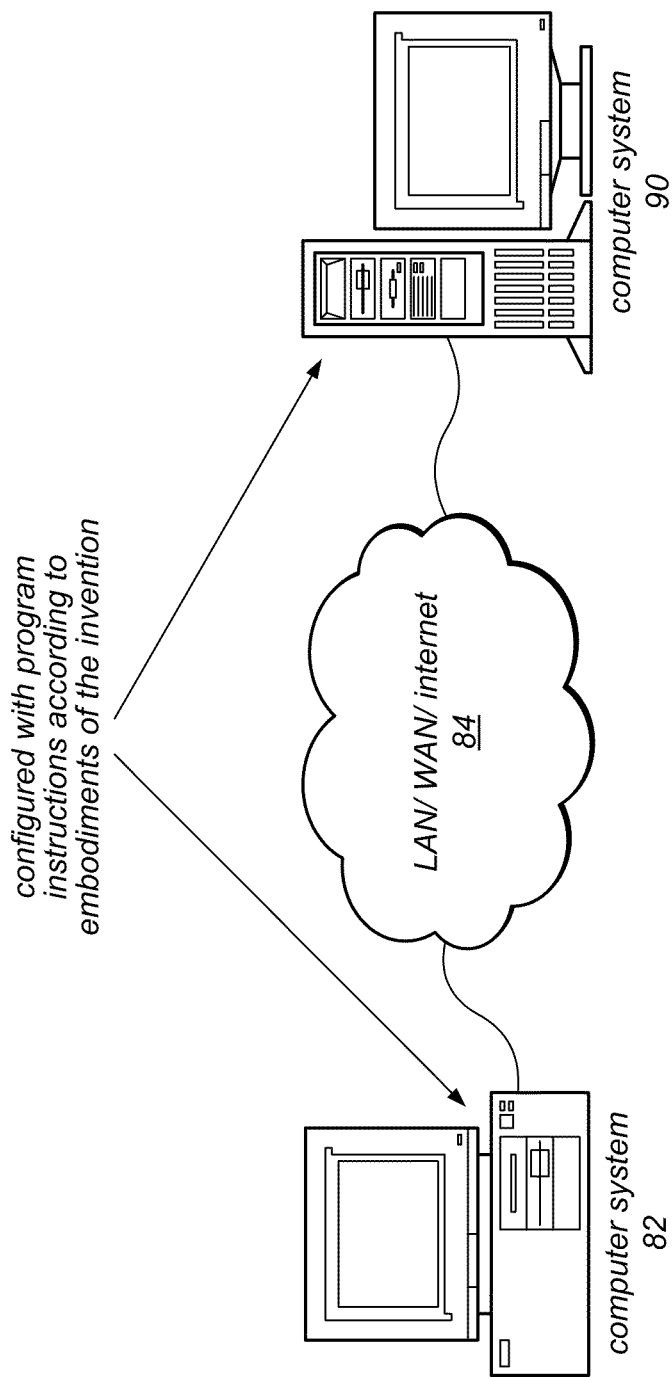
FIG. 1B illustrates a network system comprising two or more computer systems that may implement an embodiment of the present invention.

FIG. 1B—Computer Network

FIG. 1B illustrates a system including a first computer system 82 that is coupled to a second computer system 90. The computer system 82 may be coupled via a network 84 (or a computer bus) to the second computer system 90. The computer systems 82 and 90 may each be any of various types, as desired. The network 84 can also be any of various types, including a LAN (local area network), WAN (wide area network), the Internet, or an Intranet, among others. The computer systems 82 and 90 may execute a program implementing one embodiment of the invention, e.g., a graphical program development environment with semantic analysis functionality described herein, in a distributed fashion. For example, computer 82 may display a user interface for the development environment, and computer system 90 may execute the application portion of the development environment. As another example, computer 82 may display the graphical user interface of a graphical program and computer system 90 may execute the block diagram of the graphical program.

Exemplary Systems

Embodiments of the present invention may be involved with performing test and/or measurement functions; controlling and/or modeling instrumentation or industrial automation hardware; modeling and simulation functions, e.g., modeling or simulating a device or product being developed or tested, etc. Exemplary test applications where the graphical program may be used include hardware-in-the-loop testing and rapid control prototyping, among others. For example, the graphical programs developed using the techniques described herein may be used in any of such industrial applications.

However, it is noted that embodiments of the present invention can be used for a plethora of applications and is not limited to the above applications. In other words, applications discussed in the present description are exemplary only, and embodiments of the present invention may be used in any of various types of systems. Thus, embodiments of the system and method of the present invention is configured to be used in any of various types of applications, including the control of other types of devices such as multimedia devices, video devices, audio devices, telephony devices, Internet devices, etc., as well as general purpose software applications such as word processing, spreadsheets, network control, network monitoring, financial applications, games, etc.

FIG. 2A illustrates an exemplary instrumentation control system 100 which may implement embodiments of the invention. The system 100 comprises a host computer 82 which couples to one or more instruments. The host computer 82 may comprise a CPU, a display screen, memory, and one or more input devices such as a mouse or keyboard as shown. The computer 82 may operate with the one or more instruments to analyze, measure or control a unit under test (UUT) or process 150, e.g., via execution of software 104.

The one or more instruments may include a GPIB instrument 112 and associated GPIB interface card 122, a data acquisition board 114 inserted into or otherwise coupled with chassis 124 with associated signal conditioning circuitry 126, a VXI instrument 116, a PXI instrument 118, a video device or camera 132 and associated image acquisition (or machine vision) card 134, a motion control device 136 and associated motion control interface card 138, and/or one or more computer based instrument cards 142, among other types of devices. The computer system may couple to and operate with one or more of these instruments. The instruments may be coupled to the unit under test (UUT) or process 150, or may be coupled to receive field signals, typically generated by transducers. The system 100 may be used in a data acquisition and control application, in a test and measurement application, an image processing or machine vision application, a process control application, a man-machine interface application, a simulation application, or a hardware-in-the-loop validation application, among others.

Figure 2B:
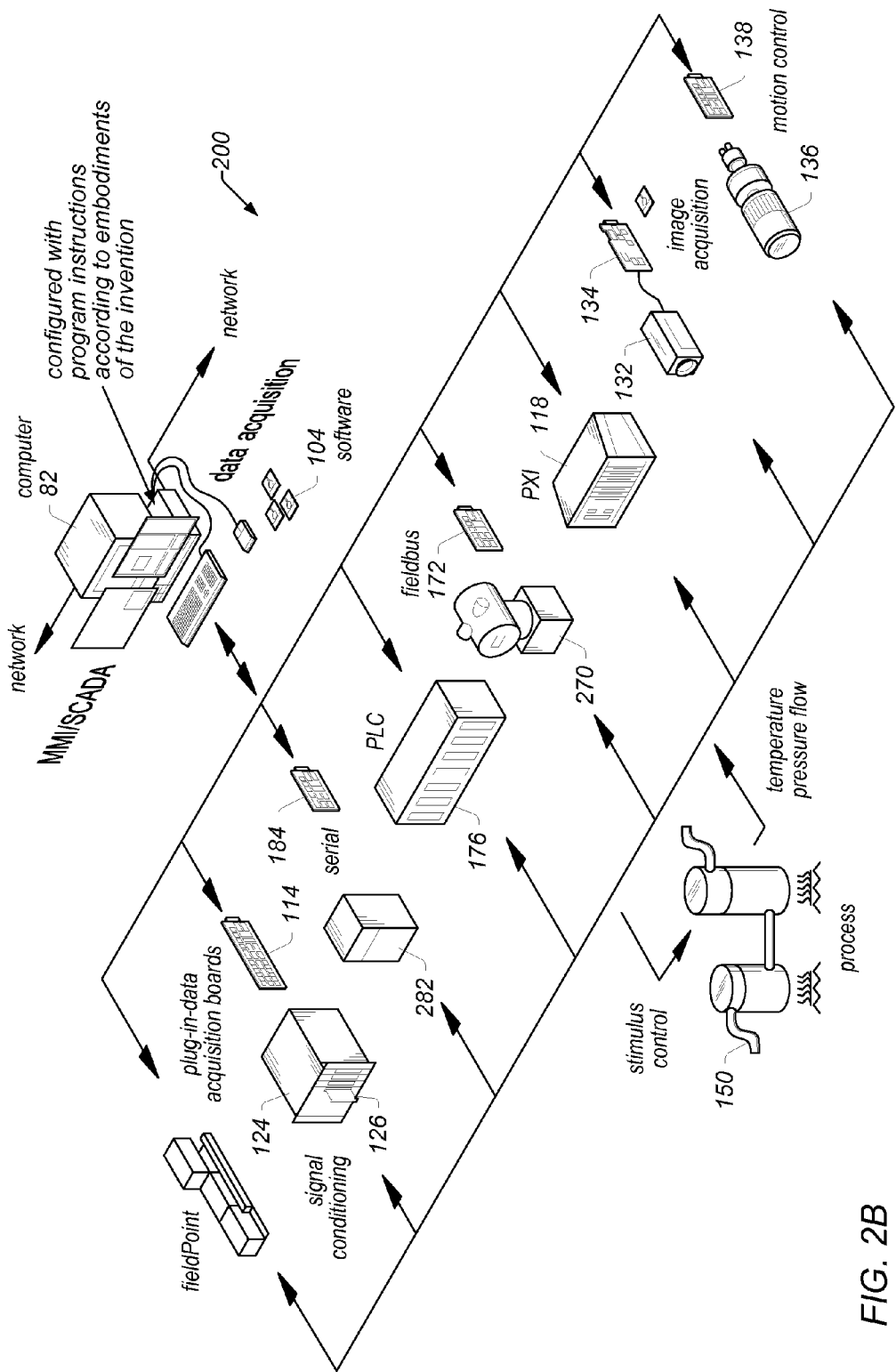
FIG. 2B illustrates an industrial automation system according to one embodiment of the invention.

FIG. 2B illustrates an exemplary industrial automation system 200 which may implement embodiments of the invention. The industrial automation system 200 is similar to the instrumentation or test and measurement system 100 shown in FIG. 2A. Elements which are similar or identical to elements in FIG. 2A have the same reference numerals for convenience. The system 200 may comprise a computer 82 which couples to one or more devices or instruments. The computer 82 may comprise a CPU, a display screen, memory, and one or more input devices such as a mouse or keyboard as shown. The computer 82 may operate with the one or more devices to perform an automation function with respect to a process or device 150, such as MMI (Man Machine Interface), SCADA (Supervisory Control and Data Acquisition), portable or distributed data acquisition, process control, advanced analysis, or other control, among others, e.g., via execution of software 104.

The one or more devices may include a data acquisition board 114 inserted into or otherwise coupled with chassis 124 with associated signal conditioning circuitry 126, a PXI instrument 118, a video device 132 and associated image acquisition card 134, a motion control device 136 and associated motion control interface card 138, a fieldbus device 270 and associated fieldbus interface card 172, a PLC (Programmable Logic Controller) 176, a serial instrument 282 and associated serial interface card 184, or a distributed data acquisition system, such as the Fieldpoint system available from National Instruments, among other types of devices.

Figure 3A:
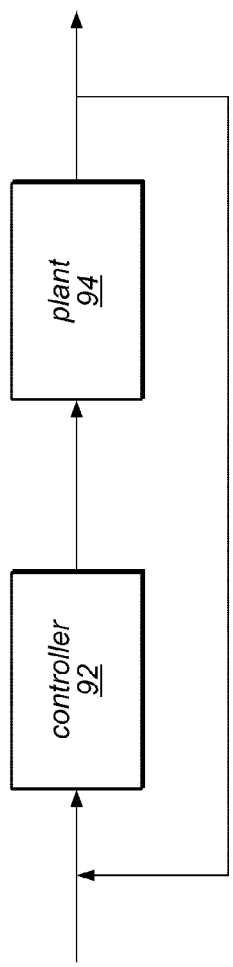
FIG. 3A is a high level block diagram of an exemplary system which may execute or utilize graphical programs.

FIG. 3A is a high level block diagram of an exemplary system which may execute or utilize graphical programs. FIG. 3A illustrates a general high-level block diagram of a generic control and/or simulation system which comprises a controller 92 and a plant 94. The controller 92 represents a control system/algorithm the user may be trying to develop. The plant 94 represents the system the user may be trying to control. For example, if the user is designing an ECU for a car, the controller 92 is the ECU and the plant 94 is the car's engine (and possibly other components such as transmission, brakes, and so on.) As shown, a user may create a graphical program that specifies or implements the functionality of one or both of the controller 92 and the plant 94. For example, a control engineer may use a modeling and simulation tool to create a model (graphical program) of the plant 94 and/or to create the algorithm (graphical program) for the controller 92.

Figure 3B:
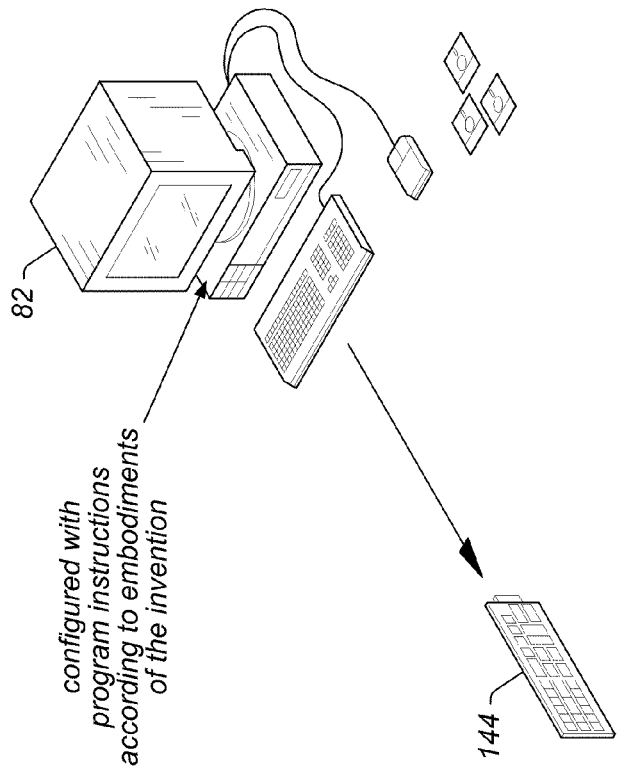
FIG. 3B illustrates an exemplary system which may perform control and/or simulation functions utilizing graphical programs.

FIG. 3B illustrates an exemplary system which may perform control and/or simulation functions. As shown, the controller 92 may be implemented by a computer system 82 or other device (e.g., including a processor and memory medium and/or including a programmable hardware element) that executes or implements a graphical program. In a similar manner, the plant 94 may be implemented by a computer system or other device 144 (e.g., including a processor and memory medium and/or including a programmable hardware element) that executes or implements a graphical program, or may be implemented in or as a real physical system, e.g., a car engine.

In one embodiment of the invention, one or more graphical programs may be created which are used in performing rapid control prototyping. Rapid Control Prototyping (RCP) generally refers to the process by which a user develops a control algorithm and quickly executes that algorithm on a target controller connected to a real system. The user may develop the control algorithm using a graphical program, and the graphical program may execute on the controller 92, e.g., on a computer system or other device. The computer system 82 may be a platform that supports real time execution, e.g., a device including a processor that executes a real time operating system (RTOS), or a device including a programmable hardware element.

In one embodiment of the invention, one or more graphical programs may be created which are used in performing Hardware in the Loop (HIL) simulation. Hardware in the Loop (HIL) refers to the execution of the plant model 94 in real time to test operation of a real controller 92. For example, once the controller 92 has been designed, it may be expensive and complicated to actually test the controller 92 thoroughly in a real plant, e.g., a real car. Thus, the plant model (implemented by a graphical program) is executed in real time to make the real controller 92 "believe" or operate as if it is connected to a real plant, e.g., a real engine.

In the embodiments of FIGS. 2A, 2B, and 3B above, one or more of the various devices may couple to each other over a network, such as the Internet. In one embodiment, the user operates to select a target device from a plurality of possible target devices for programming or configuration using a graphical program. Thus the user may develop a graphical program on a computer using the techniques disclosed herein, and use (execute) the graphical program on that computer or deploy the graphical program to a target device (for remote execution on the target device) that is remotely located from the computer and coupled to the computer through a network.

Graphical software programs which perform data acquisition, analysis and/or presentation, e.g., for measurement, instrumentation control, industrial automation, modeling, or simulation, such as in the applications shown in FIGS. 2A and 2B, may be referred to as virtual instruments.

Figure 4:
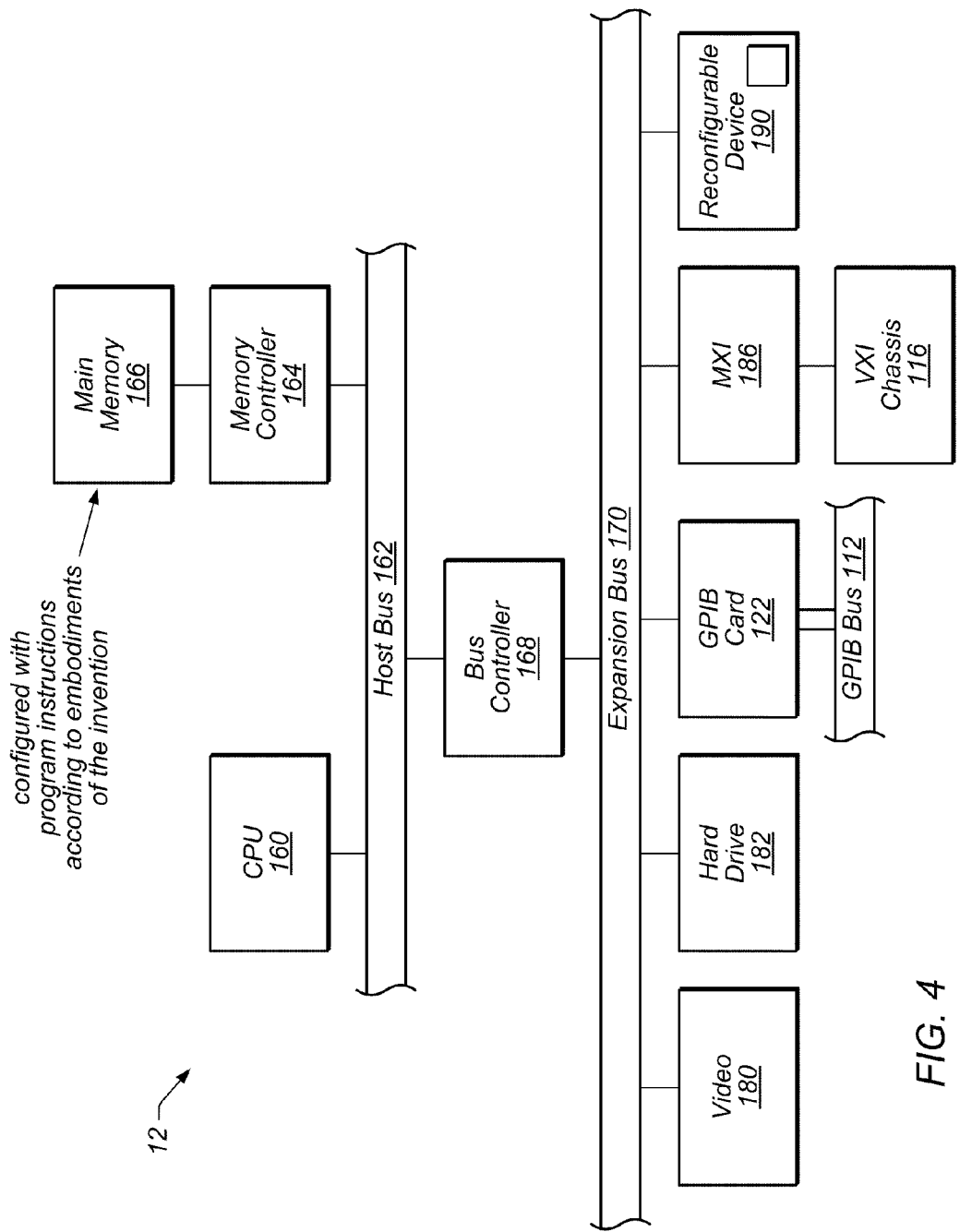
FIG. 4 is an exemplary block diagram of the computer systems of FIGS. 1A, 1B, 2A and 2B and 3B.

FIG. 4—Computer System Block Diagram

FIG. 4 is a block diagram representing one embodiment of the computer system 82 and/or 90 illustrated in FIGS. 1A and 1B, or computer system 82 shown in FIG. 2A or 2B. It is noted that any type of computer system configuration or architecture can be used as desired, and FIG. 4 illustrates a representative PC embodiment. It is also noted that the computer system may be a general purpose computer system, a computer implemented on a card installed in a chassis, or other types of embodiments. Elements of a computer not necessary to understand the present description have been omitted for simplicity.

The computer may include at least one central processing unit or CPU (processor) 160 which is coupled to a processor or host bus 162. The CPU 160 may be any of various types, including an x86 processor, e.g., a Pentium class, a PowerPC processor, a CPU from the SPARC family of RISC processors, as well as others. A memory medium, typically comprising RAM and referred to as main memory, 166 is coupled to the host bus 162 by means of memory controller 164. The main memory 166 may store the graphical program development environment, according to one embodiment of the invention, as well as one or more graphical programs. The main memory may also store operating system software, as well as other software for operation of the computer system.

The host bus 162 may be coupled to an expansion or input/output bus 170 by means of a bus controller 168 or bus bridge logic. The expansion bus 170 may be the PCI (Peripheral Component Interconnect) expansion bus, although other bus types can be used. The expansion bus 170 includes slots for various devices such as described above. The computer 82 further comprises a video display subsystem 180 and hard drive 182 coupled to the expansion bus 170. The computer 82 may also comprise a GPIB card 122 coupled to a GPIB bus 112, and/or an MXI device 186 coupled to a VXI chassis 116.

As shown, a device 190 may also be connected to the computer. The device 190 may include a processor and memory which may execute a real time operating system. The device 190 may also or instead comprise a programmable hardware element. The computer system may be configured to deploy a graphical program to the device 190 for execution of the graphical program on the device 190. The deployed graphical program may take the form of graphical program instructions or data structures that directly represents the graphical program. Alternatively, the deployed graphical program may take the form of text code (e.g., C code) generated from the graphical program. As another example, the deployed graphical program may take the form of compiled code generated from either the graphical program or from text code that in turn was generated from the graphical program.

Overview of Semantic Analysis of Graphical Programs

While editing a graphical program, e.g., in a LabVIEW graphical program editor, the user may make changes that affect the semantics of the program, i.e. changing or adding operations the program should perform, modifying connectivity among graphical program nodes, and so forth. After any such edits, the program may contain new semantic errors, old errors could be fixed, and the types of the data of various operations may have changed. Thus, a process of semantic analysis (e.g., semantic checking) may be performed to give the user quick feedback on the validity of the edited graphical program.

Figure 5:
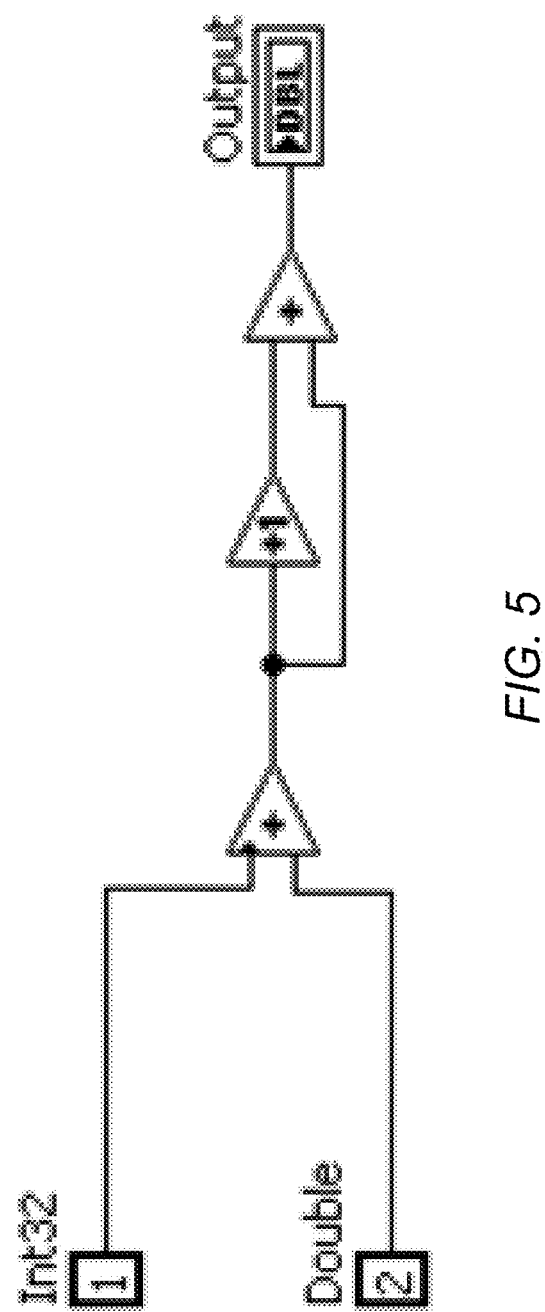
FIG. 5 illustrates a simple exemplary graphical program, according to one embodiment.

FIG. 5 illustrates a very simple exemplary graphical program, written in the G graphical program language supported by the LabVIEW graphical program development environment provided by National Instruments Corporation, although any other types of graphical programs are also contemplated. As may be seen, in this example, two constants, an int32 (32-bit integer) and a double (double precision floating point), respectively, are added together, then that sum is added to itself plus 1, resulting in a double type output, as indicated by the Output node. Note that the actual value of the Output after execution would presumably be shown in the program's user interface, e.g., front panel.

Semantic analysis is the construction and checking of semantic information in a program. In various embodiments, semantic analysis may include type propagation, type checking, and object binding (in which variable and function references are resolved), among others. In graphical programs, typically, while the data types of some variables, constants, and parameters are specified explicitly, e.g., at declaration or definition time, most variable types are only specified implicitly, i.e. in relation to other variables, constants or parameters. Type propagation refers to the construction of type information at or for all tokens in the program so that all uses and references to variables have types associated with them. Described in a slightly different way, type propagation is the assigning of types to all data operated on in the program. Most data are represented by wires in some graphical programs, e.g., LabVIEW graphical programs. Thus, in effect, one of the main purposes of semantic analysis is assigning (data) types to all wires in the diagram. Users may see this visually as color, where the color of the wire indicates its type (the type of the data that wire represents). Users may thus think of semantic analysis as type propagation because it makes the wires in their programs have the right color.

For example, in the graphical program of FIG. 5, only the initial two constants are explicitly assigned types (int32 and double). All the other variables, e.g., represented by the wires connecting the graphical program nodes, may be implicitly defined by their assignments from the initial constants. Note, for example, that function nodes require calculation of all output type information based on the data types of the inputs. In data flow graphical programs, type propagation refers to the typical process of constructing type information and proceeding through the data-flow program (e.g., as a data flow graph), calculating the types of each node and wire. For example, in the graphical program of FIG. 5, the type propagation process calculates that adding a double and an int32 returns the result as a double (typed variable), as indicated by the Output node, so labeled.

After types have been propagated to each function and assignment, type checking can be performed. Most functions (e.g., function nodes) can only take a certain set of types or a certain combination of types as inputs, e.g. attempting to add a string to an integer generates a type error in LabVIEW. As another type error example, one may attempt to call another program with incorrect types on the parameters. It should be noted that there are many other semantic errors other than type errors; for example, one can fail to "wire" enough arguments to a function—an addition function node, for example, requires at least 2 input arguments. Moreover, many, if not most, graphical programs, e.g., LabVIEW graphical programs, have a list of required input parameters that must be provided in order for that program to be called from another program.

In some embodiments, semantic analysis may also include analysis of object binding; errors in resolving the function or program being called in a program may result in a semantic error, e.g. not being able to locate on disk or in memory another program being called from the main program. Note further that in some embodiments, semantic analysis may also generate warnings and semantic notations which may indicate areas of concern in the program. For example, one type of warning regarding the coercion of types may be represented with a small red dot on or proximate to a graphical program element. Note, for example, that in the graphical program of FIG. 5, the first add function has a coercion dot on the top input indicating that the integer is being added to a larger type—a double. These errors, warnings, or notations may be presented to the user in any of various formats, e.g., graphically in the program, listed in a special "Error List" window, etc., as desired.

The following describes embodiments of a method for analyzing a graphical program, specifically, for performing asynchronous semantic analysis of the graphical program and displaying the results (types, errors and warnings). The analysis may be invoked when the user makes a semantic edit to the graphical program in an editor and may be performed as a parallel or background process with respect to the editor. During the semantic analysis, the semantic analysis may be preemptively restarted after each subsequent semantic edit. While the user is able to continue editing, all type checks and propagation, as well as any warnings and errors calculated by the analysis may be graphically reflected to the user upon completion of the background process.

Figure 6:
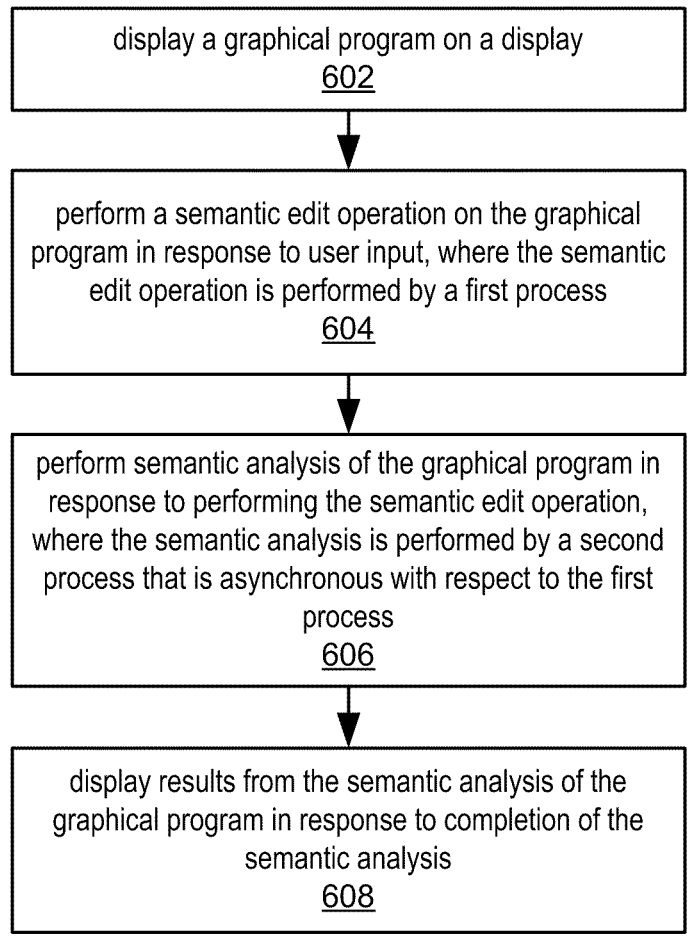
FIG. 6 is a flowchart diagram illustrating one embodiment of a method for analyzing a graphical program.

FIG. 6—Flowchart of a Method for Analyzing a Graphical Program

FIG. 6 flowcharts a method for analyzing a graphical program. The method shown in FIG. 6 may be used in conjunction with any of the computer systems or devices shown in the above Figures, among other devices. In various embodiments, some of the method elements shown may be performed concurrently, in a different order than shown, or may be omitted. Additional method elements may also be performed as desired. As shown, this method may operate as follows.

First, in 602, a graphical program may be displayed on a display, e.g., of computer 82 (or on a different computer). In some embodiments, the graphical program may be created on the computer system 82 (or on a different computer system), may be retrieved from memory, or may be received from an external source. In some embodiments, the graphical program may be or include a graphical data flow program. The graphical program may implement any functionality desired, including, for example, an industrial automation function, a process control function, or a test and measurement function, among others, as mentioned above.

The graphical program may be created or assembled by the user arranging on a display a plurality of nodes or icons and then interconnecting the nodes to create the graphical program. In response to the user assembling the graphical program, data structures may be created and stored which represent the graphical program. The nodes may be interconnected in one or more of a data flow, control flow, or execution flow format. The graphical program may thus comprise a plurality of interconnected nodes or icons which visually indicate the functionality of the graphical program. The graphical program may comprise a block diagram (that includes the interconnected nodes) and may also include a user interface portion or front panel portion. Where the graphical program includes a user interface portion, the user may optionally assemble the user interface on the display. As one example, the user may use the LabVIEW graphical programming development environment to create the graphical program.

In an alternate embodiment, the graphical program may be created by the user creating or specifying a prototype, followed by automatic or programmatic creation of the graphical program from the prototype. This functionality is described in U.S. patent application Ser. No. 09/587,682 titled "System and Method for Automatically Generating a Graphical Program to Perform an Image Processing Algorithm", which is hereby incorporated by reference in its entirety as though fully and completely set forth herein. The graphical program may be created in other manners, either by the user or programmatically, as desired. The graphical program may implement a measurement function that is desired to be performed by the instrument.

In 604, a semantic edit operation may be performed on the graphical program in response to user input, where the semantic edit operation may be performed by or via a first process. For example, in one embodiment, an editor, which may be included in or part of a graphical program development environment, may execute in or via the first process, and may receive user input specifying the semantic edit operation, in response to which the semantic edit operation may be performed, e.g., by the editor (executing in or via the first process).

As noted above, a semantic edit operation modifies the semantics of the program, i.e., modifies the functionality of the program, e.g., by changing functional elements of the program. Examples of semantic edit operations include (but are not limited to) adding a graphical program node to the graphical program, removing a graphical program node from the graphical program, adding a connection to the graphical program, removing a connection from the graphical program, or changing a connection in the graphical program, e.g., changing the interconnections among the nodes. Some nodes can actually change their configuration (e.g., size, number of inputs, number of outputs, etc.) as a result of semantic analysis; more specifically, semantic analysis may determine that a type has changed on certain nodes and this may have an additional effect in changing something about the node's configuration or operational mode.

For example, consider two wires connected to the input of an add node. Say the user originally has these wires connecting to two integers and thus the add node is in a "numeric" mode. Later, the user may replace the integers with matrices, thus placing the add node into "matrix" mode, which can modify the number of inputs and outputs, such as the addition of an error terminal, in addition to perhaps changing the visual view of the node. Since any integers can be added, there is no need for an error terminal in a numeric add; however, not every matrix can be added to any other matrix, and so an error output for the node or operation may be needed. Thus, in some embodiments, the semantic edit operations may include changing configuration of a graphical program node, among others.

More generally, a semantic edit operation modifies some functional aspect of the program, e.g., as opposed to cosmetic modifications, e.g., that only change the appearance of the graphical program.

Figure 7A:
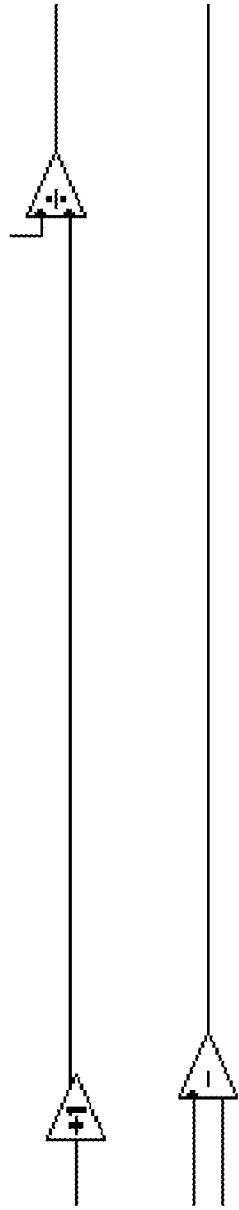
FIG. 7A illustrates an exemplary graphical program under development, according to one embodiment.

FIG. 7A illustrates an exemplary graphical program under development. More specifically, FIG. 7A shows portion of a block diagram of a LabVIEW graphical program being developed or edited under a graphical program development environment or editor. Thus, the portion shown may be understood to be part of a larger program (e.g., block diagram). Note also that in some embodiments, the graphical program may include, in addition to the block diagram, a user interface portion, which may be referred to as a front panel.

As shown, in this graphical program (portion), an "add 1" node (labeled "+1") is connected or wired to a divide node (labeled "÷"), and a subtraction node (labeled "−") is present, but not shown connected to either of the other two nodes.

In 606, semantic analysis of the graphical program may be performed in response to the semantic edit operation of 604. For example, in one embodiment, the semantic analysis may include one or more of: type propagation, type checking, argument checking, or object binding, among others.

For more detailed information regarding type propagation and checking, please see one or more of: U.S. application Ser. No. 09/742,946, titled "System and Method for Performing Type Checking for Hardware Device Nodes in a Graphical Program," U.S. application Ser. No. 11/269,217 titled "Type Propagation For Automatic Casting Of Output Types In A Data Flow Program," U.S. application Ser. No. 12/430,157 titled "Conversion of a Class Oriented Data Flow Program to a Structure Oriented Data Flow Program," U.S. application Ser. No. 11/838,387 titled "Type Generic Graphical Programming," U.S. Pat. No. 5,905,649 titled "System And Method For Performing Type Checking And Class Propagation Of Attributes In A Graphical Data Flow Program," U.S. Pat. No. 6,064,816 titled "System and Method for Performing Class Propagation and Type Checking in a Graphical Automation Client," and U.S. Pat. No. 7,331,037 titled "Static Memory Allocation In A Graphical Programming System," each of which was incorporated by reference above.

In some embodiments, the semantic analysis may be performed by or in a second process that is asynchronous with respect to the first process. For example, in various embodiments, the first process and the second process may be implemented via respective execution threads, and/or via respective processors or processing cores. In one embodiment, the semantic edit operation may be performed by an editor executing in the first process, and the semantic analysis may be performed as a background process in or by the second process. In a similar embodiment, the semantic edit operation may be performed by the editor executing in the first process, and the semantic analyses may be performed in the second process in parallel (i.e., concurrently) with the editor executing in the first process. Thus, the user may continue to edit the graphical program via the first process while the semantic analysis is being performed via the second process.

Thus, for example, in an exemplary embodiment based on asynchronous use of user-interface threads and background threads, semantic checking may be performed in a background thread while the user may continue to edit in a user-interface thread. Should the user perform any semantic edit (e.g., that would invalidate the results of the semantic analysis currently being performed), the method may abort the current background (semantic analysis) thread and start a new one based on the program's new state. Should the entire semantic analysis complete before the user has made any changes to the program, the method may callback into the user-interface thread with the semantic analyzed and updated copy of the program. The user-interface thread may then make the user wait while the original program's types and errors are updated (quickly) and displayed, e.g., graphically.

It should be noted that while in some embodiments, the first and second processes may execute on respective processors or processing cores, e.g., via one or more respective execution threads executing on the respective processor or core, in other embodiments, the first and second processes may execute on a single processor or processing core, e.g., via respective threads sharing the single processor or core. Thus, the parallelism or concurrency may be implemented strictly, or via resource sharing, e.g., interleaved thread execution, between which techniques the differences may not be apparent to the user.

In further embodiments, the second process, and/or the first process, may itself comprise multiple asynchronous or parallel processes, e.g., parallel sub-processes. In other words, one or both of the first and second processes may comprise two or more respective asynchronous or parallel processes. Thus, for example, in one embodiment, the semantic analysis may be performed by multiple threads executing in parallel, e.g., executing on respective processors or processing cores, e.g., at least partly concurrently.

In some embodiments, performing semantic analysis of the graphical program may include performing semantic analysis on a specified portion (or portions) of the graphical program in which the semantic edit operation was performed. In other words, the semantic analysis may not be performed on the entire graphical program, but may be limited to those portions affected by the semantic edit operation.

In 608, in response to completion of the semantic analysis, results of the semantic analysis of the graphical program may be displayed on the display, e.g., a computer display coupled to the computer hosting the development environment/editor.

Figure 7B:
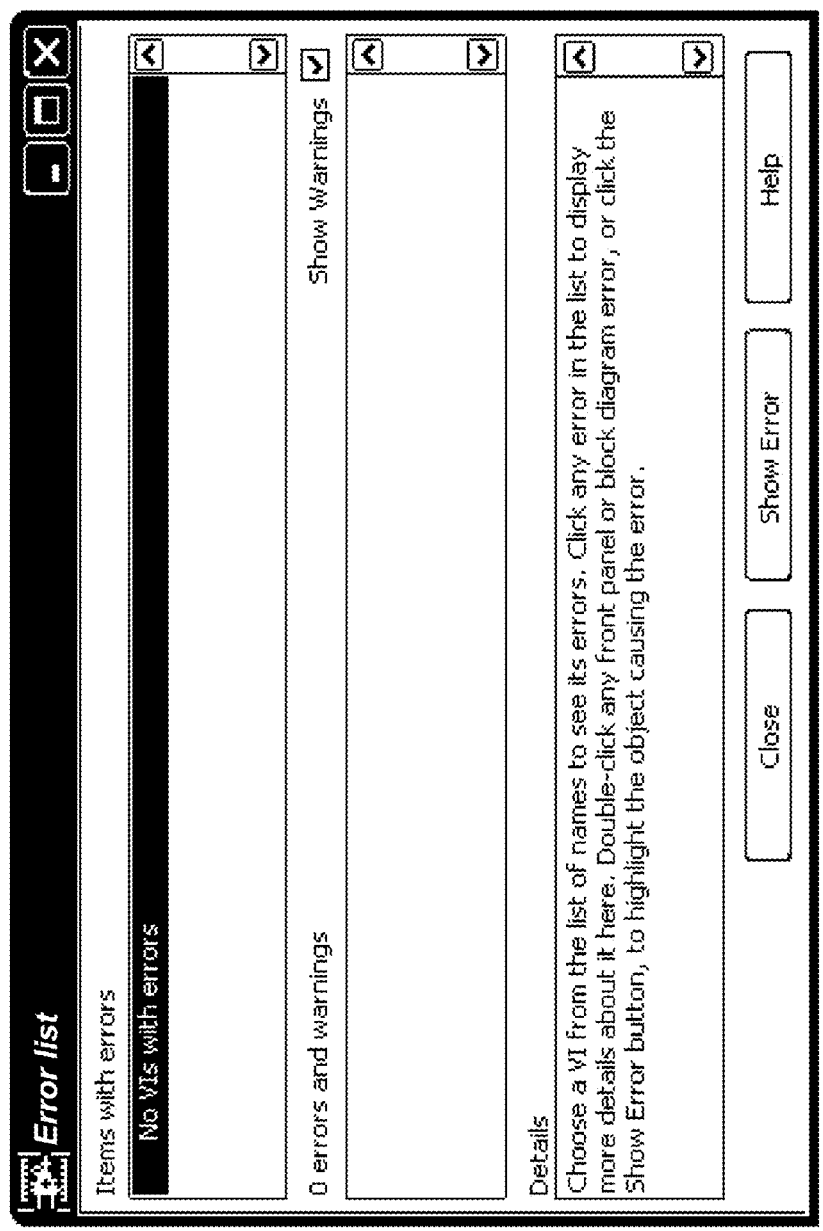
FIG. 7B illustrates exemplary results from semantic analysis of the graphical program of FIG. 7A, according to one embodiment.

FIG. 7B illustrates a screenshot of an exemplary GUI within which the results of the semantic analysis of the graphical program of FIG. 7A are displayed. As may be seen, there are currently no errors or warnings reported for the graphical program.

In various embodiments, the results of the semantic analysis may include any information that may be useful in developing or debugging the graphical program. For example, in some embodiments, the results of the semantic analysis may include one or more of: one or more errors, one or more warnings, one or more data type assignments to node inputs and outputs, one or more configuration changes to nodes, or one or more semantic notations indicating areas of concern in the program, among others. Moreover, the results may be displayed or presented in any of a variety of ways. For example, in one embodiment, at least one of the one or more errors, the one or more warnings, the one or more data type assignments, the one or more configuration changes, or the one or more semantic notations may be represented graphically in the graphical program. Exemplary semantic analysis results are described below with respect to FIGS. 8B, 9B, 10B, and 11B.

In some embodiments, during the semantic analysis of 606, another semantic edit operation may be performed on the graphical program in response to next user input. As with the semantic edit operation of 604, the other semantic edit operation may be performed by the first process. Note that the above descriptions regarding semantic edit operations in general, and that of 606 in particular, may also be applied to this other semantic edit operation (and subsequent operations, as well), and for brevity are not repeated here.

In response to the performing of the other semantic edit operation, the semantic analysis may be preemptively terminated, e.g., aborted, and re-initiated, where, as before, the re-initiated semantic analysis may be performed by the second process asynchronously with respect to the first process. Thus, for example, in an embodiment where the first process (in which the editor executes) includes or utilizes one or more execution threads and/or processors or cores, and the second process (in which the semantic analysis is performed) includes or utilizes a respective other one or more execution threads and/or processors or cores, the editor performing the second semantic edit operation may cause or invoke termination and re-initiation of the semantic analysis, whereby the graphical program, as just edited, may be semantically analyzed. Said another way, the other (i.e., subsequent) semantic edit operation may result in preemptive restarting of the semantic analysis (preemptive with respect to the semantic analysis that is/was currently being performed).

It should be noted that in embodiments utilizing threads, the second process may or may not use the exact same thread or threads for each performance of the semantic analysis. For example, if threads are assigned to the respective processes in an ad hoc manner, then the thread(s) used in the restarted analysis may be different from the thread(s) used in the initial analysis, the crucial point being that the analysis is performed asynchronously with respect to the process in which the edit operations (e.g., the editor) are executed.

The above performing another semantic edit operation and preemptively terminating and re-initiating performing the semantic analysis may be performed one or more times, i.e., may be repeated zero or more times, as desired. For example, in one embodiment, each time a semantic edit operation is performed, if the semantic analysis is not yet finished, the semantic analysis may be preemptively stopped and restarted, executing asynchronously (e.g., in the background) with respect to the editor.

As noted above, in some embodiments the semantic analysis may only be performed with respect to the specified portion (or portions) of the graphical program in which the semantic edit operation was performed. However, in some cases, the other semantic edit operation (or a subsequent semantic edit operation) may affect semantic relations elsewhere in the graphical program besides the immediate portion in which the edit occurs. In other words, the other (subsequent) semantic edit operation may invalidate results of previous semantic analysis (or analyses) performed on another respective portion (or portions) of the graphical program.

In a related embodiment, the semantic analysis may be preemptively terminated and restarted if the other semantic edit operation(s) would invalidate not only results from the current semantic analysis, but of one or more previous semantic analyses, as well.

Thus, in some embodiments, re-initiating performing the semantic analysis with respect to the graphical program in the second process may include re-initiating performing semantic analysis on at least a specified portion of the graphical program in which the other semantic edit operation was performed. Thus, for example, in one embodiment, the semantic analysis may be re-initiated with respect to not only the portion of the graphical program in which the other (e.g., most recent) semantic edit operation was performed, but also with respect to one or more additional portions of the graphical program, e.g., those that have been previously analyzed.

It should be noted that in some embodiments, not all semantic edit operations may trigger the preemptive termination and re-initialization of the semantic analysis. For example, semantic edits that would not invalidate results from the current semantic analysis may not do so. Thus, in one embodiment, the other semantic edit operations may be limited to semantic edit operations that would invalidate results from semantic analysis currently being performed.

Thus, in one embodiment, the method may include performing one or more further edit operations on the graphical program in response to further user input, where the one or more further edit operations are performed by the first process, and where the one or more further edit operations would not invalidate results from semantic analysis currently being performed, and where the one or more further edit operations do not cause preemptive termination and re-initiation of performing the semantic analysis with respect to the graphical program in the second process.

In some embodiments, performing the semantic analysis of the graphical program may include making a copy of the graphical program, and performing semantic analysis on the copy of the graphical program. This may both facilitate and take advantage of the asynchronous relationship between the functionality or operation of the editor (or development environment) and the semantic analysis process in that the semantic analysis may proceed while the user continues to edit the graphical program. In other words, during the semantic analysis, the user may continue editing without fear of corruption from concurrent edits.

In further embodiments, it may be more efficient or effective to perform semantic analysis on another form of the graphical program, and so performing semantic analysis of the graphical program may include making an alternate representation of the graphical program, and performing semantic analysis on the alternate representation of the graphical program. In other words, the semantic analysis may be at least somewhat optimized by converting or translating the graphical program to another form more amenable to the semantic analysis. For example, in one exemplary embodiment, the alternate representation may be or include a data flow intermediate representation (DFIR), in which data flow protocols are maintained but various of the program elements and/or structures may be simplified or otherwise replaced or reorganized. This copy or alternate representation of the program may be or follow a data flow model, but may be optimized for semantic analysis and optimizations. Semantic analysis can then be safely performed on this alternative model copy asynchronously, in a parallel process. Note, however, that in other embodiments, any other alternate representations may be used as desired.

Alternatively, synchronization locks may be used to allow for safe concurrent edits between the user and semantic analysis. Rather than making a copy of the program (whether it be an actual copy or an alternative representation), one may attempt to share the original program between threads. However, this sharing means that before either thread makes changes, it needs to consider whether the other thread is attempting to make a change at the same time (concurrent edits). There are many algorithms that handle this synchronization problem, called mutual exclusion algorithms, most involving some sort of lock or "mutex" indicating that the thread holding the lock at a given time has the sole right to make edits. However, this approach is rife with problems, and so may not be desired.

As noted above, the semantic analysis may not be preemptively terminated and restarted unless the edit operations would invalidate semantic analysis results.

In embodiments where the preemptively terminating and re-initiating performing the semantic analysis are performed (one or more times), the above displaying results (608) from the semantic analysis of the graphical program in response to completion of the semantic analysis may be or include displaying results from the re-initiated semantic analysis of the graphical program in response to completion of the re-initiated semantic analysis.

Note that since each successive semantic edit operation may invalidate any respective currently executing semantic analysis results, which is why the respective current semantic analysis may be preemptively terminated (and restarted or re-initiated), results from each preemptively terminated semantic analysis may be similarly invalidated, and thus, the results ultimately displayed may only reflect the most recently performed and completed (not preemptively terminated) semantic analysis.

FIGS. 8A-11B illustrate further exemplary edit/analysis cycles with respect to the graphical program (portion) of FIG. 7A, where successive semantic edits invoke semantic analysis of a portion of a simple exemplary graphical program, with results of each semantic analysis being displayed in a GUI. More specifically, a simple exemplary edit session is described and illustrated by these figures. Note that these figures are in pairs, e.g., 8A and 8B, 9A and 9B, etc., where the "A" figures present an edited graphical program (portion), and the "B" figures present exemplary results from semantic analysis of the respective graphical program (portion). For brevity, the graphical program portions will be referred to simply as graphical programs.

Figure 8A:
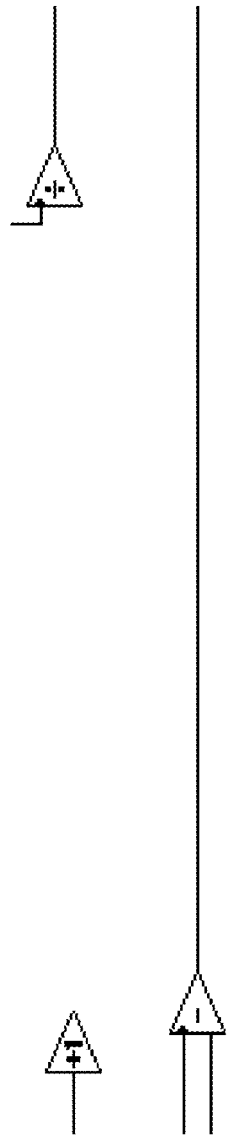
FIG. 8A illustrates the exemplary graphical program of FIG. 7A after a semantic edit operation has been performed, according to one embodiment.
Figure 8B:
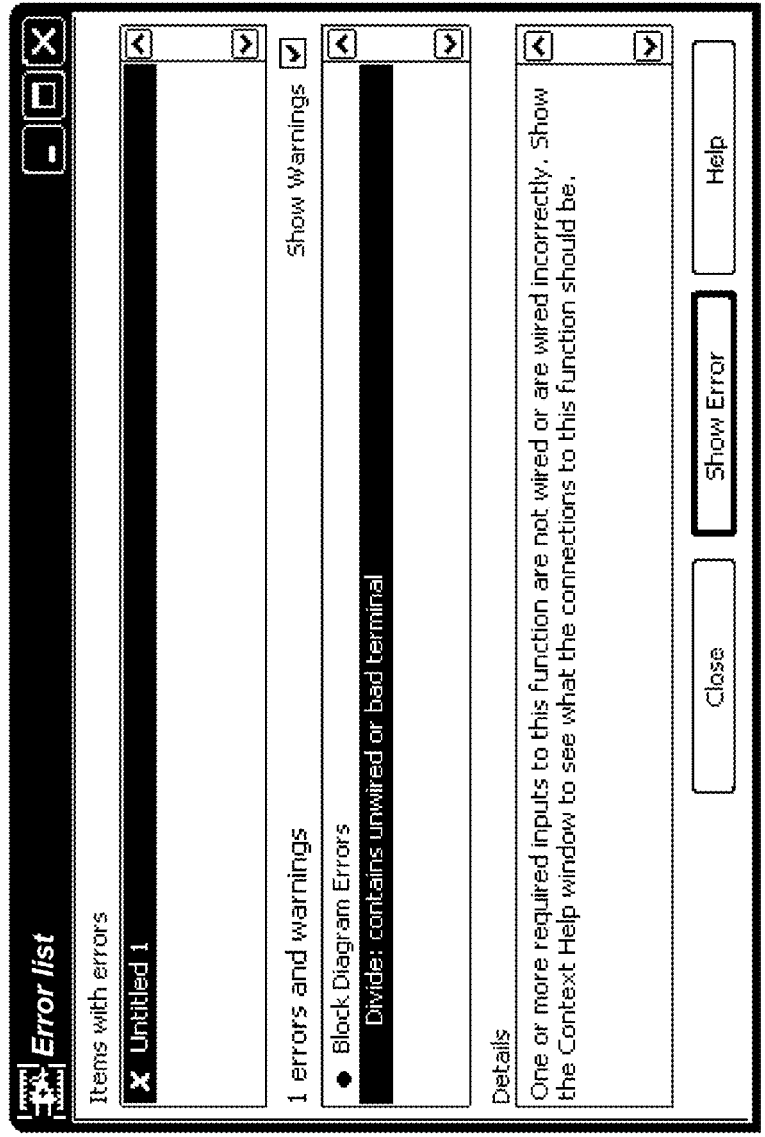
FIG. 8B illustrates exemplary results from semantic analysis of the graphical program of FIG. 8A, according to one embodiment.

Regarding the graphical program of FIG. 8A, the user has decided to add an "addition" operation or node to the program between two already wired nodes. The user deletes a wire between the two nodes between which he wishes to add the addition operation. In response to this edit, the method may make a quick special copy (which may be an alternate representation) of the current program, and begin semantic analysis of the program (copy) in a background thread, which may result in numerous type changes, errors, or warnings. The user may take a while to pick the "addition" operation node out of the menu, allowing enough time for the background thread to complete, and the results of the semantic analysis may be updated graphically for the user, as shown in the GUI of FIG. 8B. As FIG. 8B shows, an error in the block diagram (program portion) has been detected and reported: the divide operation or node contains an unwired or bad terminal. More specifically, that "One or more required inputs to this function are not wired or are wired incorrectly." In this particular embodiment, the GUI instructs the user to view a "Context Help window to see what the connections to this function should be."

Thus, in some embodiments, auxiliary information may be made available to the user to aid in correcting the detected errors (or warnings).

Figure 9A:
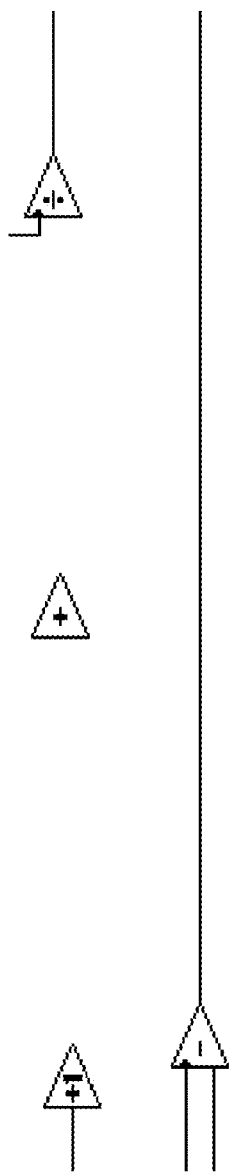
FIG. 9A illustrates the exemplary graphical program of FIG. 8A after a further semantic edit operation has been performed, according to one embodiment.
Figure 9B:
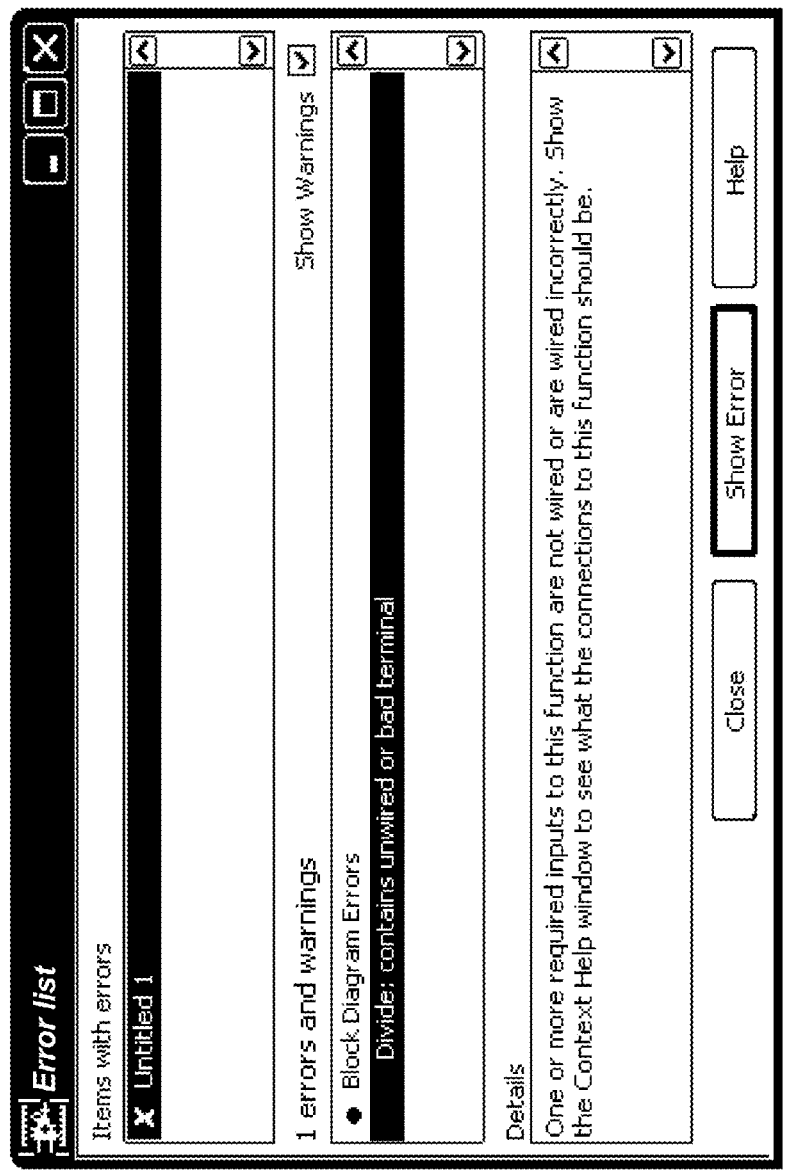
FIG. 9B illustrates exemplary results from semantic analysis of the graphical program of FIG. 8A, as displayed due to semantic analysis of the edit in 9A being interrupted by the semantic edit in FIG. 10A, according to one embodiment.
Figure 10A:
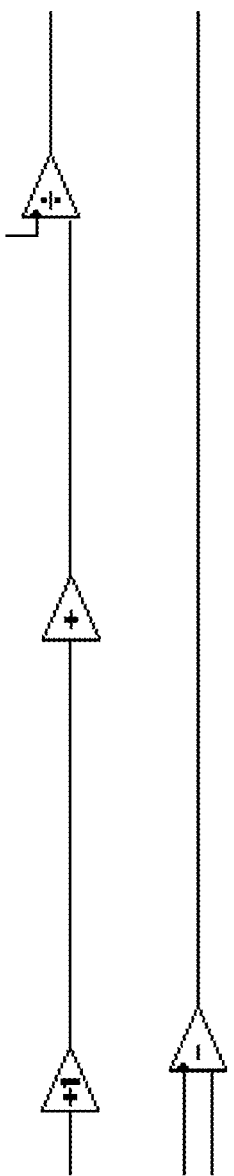
FIG. 10A illustrates the exemplary graphical program of FIG. 9A after another semantic edit operation has been performed, according to one embodiment.
Figure 10B:
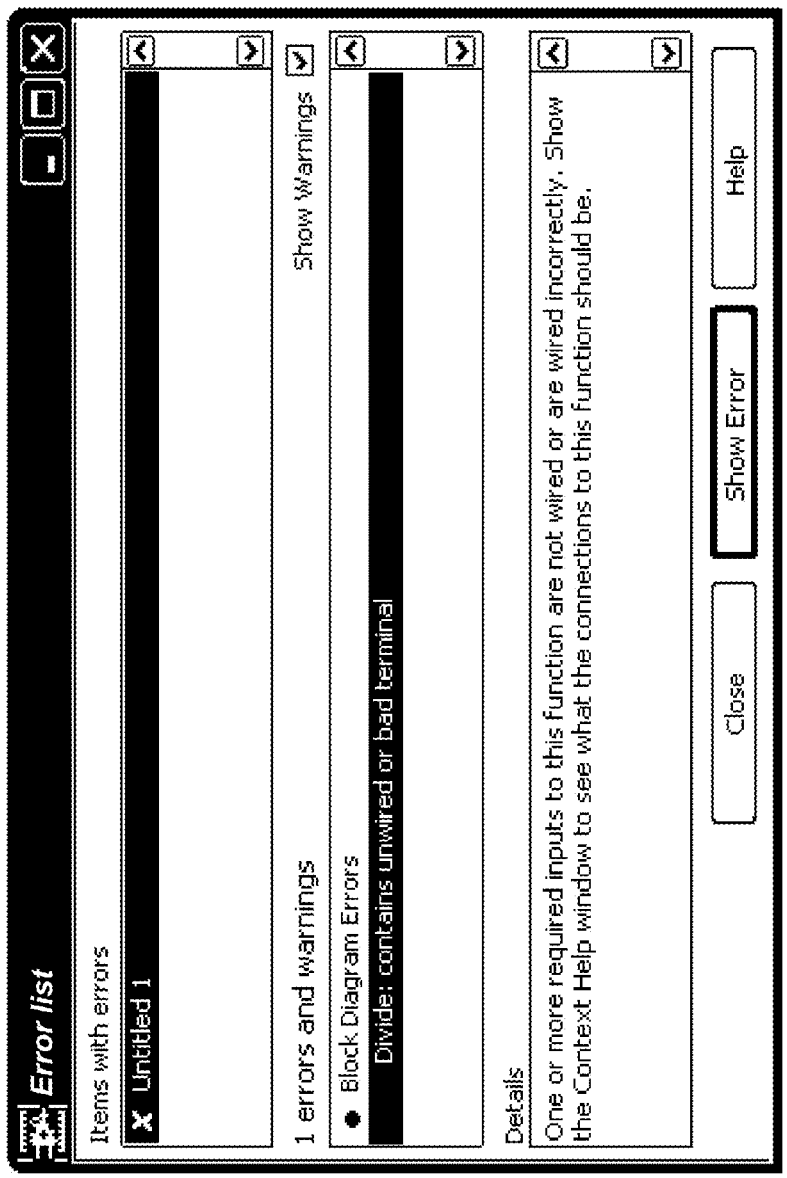
FIG. 10B illustrates exemplary results from semantic analysis of the graphical program of FIG. 8A, as displayed due to semantic analysis of the edit in 10A being interrupted by the semantic edit in FIG. 11A, according to one embodiment.

Turning now to FIG. 9A, the user includes ("drops") the "add" node in the graphical program, as shown. In response to this edit, the method may make a new copy or alternate representation of the current program, and begins semantic analysis of the edited program in a background thread. In this illustrative case, the user then quickly wires the new add "node" to the "add 1" node, which causes the method to cancel the current semantic analysis being performed in the background thread. A copy of the current program is made and a new semantic analysis thread is launched. Note that in this case, the results of the previous, uncompleted (preemptively terminated) semantic analysis are never displayed and may be lost, since they are out-of-date and incorrect (invalid), as indicated by the unchanged results shown in the GUI of FIG. 9B. The user quickly continues wiring from the output of the "add" node to the divide node of the program, as illustrated in FIG. 10A. Note that the type of the output (wire or variable) of the add node is not known, and hence may be drawn as black (whereas a wire of known data type may be drawn with a different color, e.g., blue).

As before, in response to this new edit, the method may cancel the current semantic analysis being performed in the background thread. A copy of the current program is made and a new semantic analysis thread launched. The results of the previous, uncompleted check are again never displayed, being out-of-date and incorrect, as indicated by the GUI of FIG. 10B, which again, is unchanged.

Figure 11A:
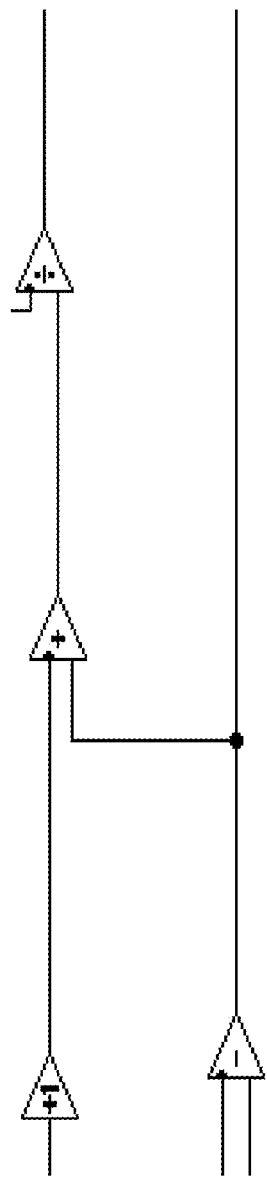
FIG. 11A illustrates the exemplary graphical program of FIG. 10A after yet another semantic edit operation has been performed, according to one embodiment.

The user continues editing, adding one last wire to complete the new diagram, as shown in FIG. 11A. Again, because this new edit occurs before the last semantic analysis is completed, the method terminates the current semantic analysis, a new copy of the program is created, and a new semantic analysis thread is launched.

Figure 11B:
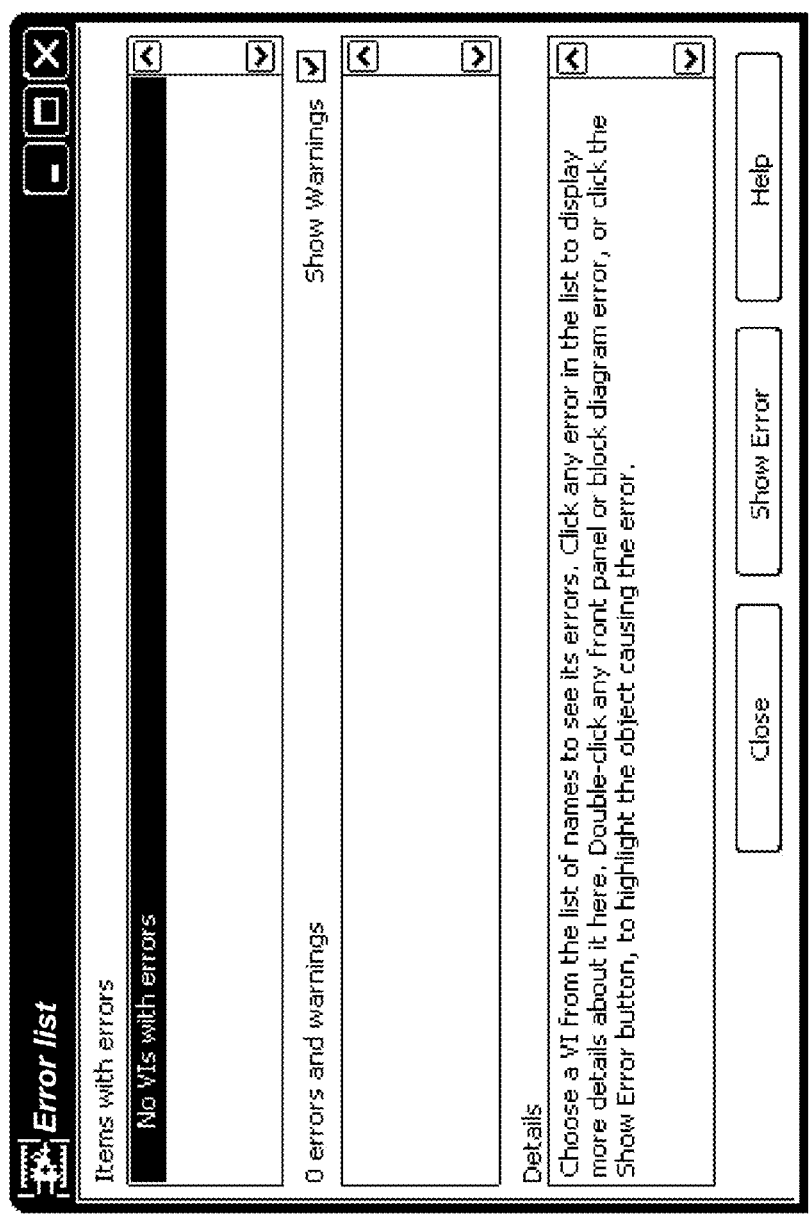
FIG. 11B illustrates exemplary results from semantic analysis of the graphical program of FIG. 11A, according to one embodiment.

In this case, the user is done with his current set of edits and thus does not immediately make another edit, giving the background thread time to complete the semantic analysis. Accordingly, the user interface (or "edit") thread then updates the graphical program with the correct types and errors (in this particular case, none), as indicated by the GUI of FIG. 11B. Note that with this particular sequence of edit operations, the method never has an opportunity to report any errors related to the add node, which is not correctly wired until the end of the series of edits.

Thus, any errors and type information from type propagation may be updated graphically to the user upon completely of the background process while the user continues working Embodiments of the techniques disclosed herein may thus allow the user to have relatively recent and accurate type and error (possibly including warning) information at their disposal as they edit without having to wait for the analysis process to complete after every single edit. Not having to wait for the analysis to complete after every edit allows for more effective, e.g., quicker and smoother, editing. Typical pauses in editing generally provide more than enough time to complete an analysis and reflect the type and error information, but the user is never forced to wait for analysis results from an analysis which he knows is going to be incomplete (invalidated) because of subsequent edits.

Thus, various embodiments of the techniques disclosed herein may provide for improved analysis of graphical programs, and thus more efficient and effective graphical program development.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A non-transitory computer readable memory medium that stores program instructions for analyzing a graphical program, wherein the program instructions are executable by a processor to:

display the graphical program on a display, wherein the graphical program comprises a plurality of interconnected nodes that visually indicate functionality of the graphical program;

perform a semantic edit operation on the graphical program in response to user input, wherein the semantic edit operation is performed by a first process;

perform semantic analysis of the graphical program in response to said performing the semantic edit operation, wherein the semantic analysis is performed by a second process, and wherein the second process is asynchronous with respect to the first process;

display results from the semantic analysis of the graphical program in response to completion of the semantic analysis; and perform one or more times:

during said performing the semantic analysis, perform another semantic edit operation on the graphical program in response to next user input, wherein the other semantic edit operation is performed by the first process; and in response to said performing the other semantic edit operation, preemptively terminate and re-initiate performing the semantic analysis with respect to the graphical program in the second process;

wherein to display results from the semantic analysis of the graphical program in response to completion of the semantic analysis, the program instructions are executable to:

display results from the re-initiated semantic analysis of the graphical program in response to completion of the re-initiated semantic analysis.

2. The non-transitory computer readable memory medium of claim 1, wherein the other semantic edit operations are limited to semantic edit operations that would invalidate results from semantic analysis currently being performed.

3. The non-transitory computer readable memory medium of claim 1, wherein said re-initiating performing the semantic analysis with respect to the graphical program in the second process comprises:

re-initiating performing semantic analysis on at least a specified portion of the graphical program in which the other semantic edit operation was performed.

4. The non-transitory computer readable memory medium of claim 1, wherein said performing semantic analysis of the graphical program comprises:

performing semantic analysis on a specified portion of the graphical program in which the semantic edit operation was performed.

5. The computer readable memory medium of claim 1, wherein the program instructions are further executable to perform:

performing one or more further semantic edit operations on the graphical program in response to further user input, wherein the one or more further semantic edit operations are performed by the first process;

wherein the one or more further semantic edit operations would not invalidate results from semantic analysis currently being performed; and wherein the one or more further semantic edit operations do not cause preemptive termination and re-initiation of said performing the semantic analysis with respect to the graphical program in the second process.

6. The non-transitory computer readable memory medium of claim 1, wherein the semantic edit operation comprises one or more of:
adding a graphical program node to the graphical program;
removing a graphical program node from the graphical program;
adding a connection to the graphical program;
removing a connection from the graphical program;
changing a connection in the graphical program; or
changing configuration of a graphical program node.

7. The non-transitory computer readable memory medium of claim 1, wherein the semantic analysis comprises one or more of:
type propagation;
type checking;
argument checking; or
object binding.

8. The non-transitory computer readable memory medium of claim 1, wherein the results of the semantic analysis comprises one or more of:
one or more errors;
one or more warnings;
one or more data type assignments to node inputs and outputs;
one or more configuration changes to nodes; or
one or more semantic notations indicating areas of concern in the program.

9. The non-transitory computer readable memory medium of claim 8, wherein at least one of the one or more errors, the one or more warnings, the one or more data type assignments, the one or more configuration changes, or the one or more semantic notations is represented graphically in the graphical program.

10. The non-transitory computer readable memory medium of claim 1, wherein the first process and the second process are implemented via one or more of:
respective execution threads; or
respective processors or processing cores.

11. The non-transitory computer readable memory medium of claim 1, wherein the semantic edit operation is performed by an editor executing in the first process, and wherein the semantic analysis is performed in the second process in parallel with the editor executing in the first process.

12. The non-transitory computer readable memory medium of claim 1, wherein said performing the semantic analysis of the graphical program comprises:
making a copy of the graphical program; and
performing semantic analysis on the copy of the graphical program.

13. The non-transitory computer readable memory medium of claim 1, wherein said performing semantic analysis of the graphical program comprises:
making an alternate representation of the graphical program; and
performing semantic analysis on the alternate representation of the graphical program.

14. The non-transitory computer readable memory medium of claim 1, wherein the graphical program comprises a graphical data flow program.

15. The non-transitory computer readable memory medium of claim 1, wherein the graphical program is configured to perform one or more of:
an industrial automation function;
a process control function;
a test and measurement function.

16. A computer-implemented method for analyzing a graphical program, comprising:
utilizing a computer to perform:
displaying the graphical program on a display, wherein the graphical program comprises a plurality of interconnected nodes that visually indicate functionality of the graphical program;
performing a semantic edit operation on the graphical program in response to user input, wherein the semantic edit operation is performed by a first process;
performing semantic analysis of the graphical program in response to said performing the semantic edit operation, wherein the semantic analysis is performed by a second process, and wherein the second process is asynchronous with respect to the first process; and
performing one or more times:
during said performing the semantic analysis, performing another semantic edit operation on the graphical program in response to next user input, wherein the other semantic edit operation is performed by the first process; and
in response to said performing the other semantic edit operation, preemptively terminating and re-initiating performing the semantic analysis with respect to the graphical program in the second process;
wherein said displaying results from the semantic analysis of the graphical program comprises:
displaying results from the re-initiated semantic analysis of the graphical program in response to completion of the re-initiated semantic analysis.

17. The computer-implemented method of claim 16, wherein the semantic edit operations are performed by an editor executing in the first process, and wherein the semantic analysis is performed in the second process in parallel with the editor executing in the first process.

18. The computer-implemented method of claim 16, wherein said performing semantic analysis of the graphical program comprises:
making an alternate representation of the graphical program; and
performing semantic analysis on the alternate representation of the graphical program.

19. The computer-implemented method of claim 16, wherein the graphical program comprises a graphical data flow program.

* * * * *